United States Patent
Gao et al.

(10) Patent No.: US 12,457,284 B2
(45) Date of Patent: Oct. 28, 2025

(54) APPLICATION DISPLAY CONTINUING METHOD AND DEVICE

(71) Applicant: Huawei Technologies Co., Ltd., Shenzhen (CN)

(72) Inventors: Xi Gao, Beijing (CN); Bangming Zhang, Beijing (CN); Hao Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 497 days.

(21) Appl. No.: 17/912,775

(22) PCT Filed: Mar. 16, 2021

(86) PCT No.: PCT/CN2021/081019
§ 371 (c)(1),
(2) Date: Sep. 19, 2022

(87) PCT Pub. No.: WO2021/185235
PCT Pub. Date: Sep. 23, 2021

(65) Prior Publication Data
US 2023/0179698 A1    Jun. 8, 2023

(30) Foreign Application Priority Data
Mar. 20, 2020   (CN) .......................... 202010203441.7

(51) Int. Cl.
*H04M 1/72409* (2021.01)
*B60K 35/10* (2024.01)
(Continued)

(52) U.S. Cl.
CPC ....... *H04M 1/724098* (2022.02); *B60K 35/10* (2024.01); *B60K 35/22* (2024.01); *B60K 35/28* (2024.01); *B60K 35/85* (2024.01)

(58) Field of Classification Search
CPC .......................... H04M 1/60; H04M 1/724098
See application file for complete search history.

(56) References Cited

U.S. PATENT DOCUMENTS 10,437,547 B2 *  10/2019  Rydenhag ............. H04L 67/303
11,137,881 B2 *  10/2021  Shim ..................... G06F 3/0481
(Continued)

FOREIGN PATENT DOCUMENTS

CN    103425494 A    12/2013
CN    107277242 A    10/2017
(Continued)

*Primary Examiner* — Wen W Huang
(74) *Attorney, Agent, or Firm* — Slater Matsil, LLP

(57) ABSTRACT

A method is provided and applied to a terminal device. The terminal device is connected to an in-vehicle device and a first application and at least one second application run on the terminal device. The method includes: sending, by the first application, a first broadcast to the at least one second application, so that the at least one second application sends a second broadcast based on the first broadcast; receiving a second broadcast sent by the at least one second application, where the second broadcast includes first data information of the second application; generating, based on the first data information, a card corresponding to the second application, and displaying the card on the in-vehicle device; and when a user taps the card corresponding to the second application, displaying, on the in-vehicle device based on the first data information of the second application, content of the second application.

20 Claims, 15 Drawing Sheets

(51) Int. Cl.
  *B60K 35/22* (2024.01)
  *B60K 35/28* (2024.01)
  *B60K 35/85* (2024.01)

(56) References Cited

U.S. PATENT DOCUMENTS

| | | | | |
|---|---|---|---|---|
| 2010/0064228 | A1* | 3/2010 | Tsern | G06F 3/04842 |
| | | | | 715/740 |
| 2010/0138780 | A1* | 6/2010 | Marano | G06F 9/452 |
| | | | | 715/781 |
| 2014/0277937 | A1* | 9/2014 | Scholz | G06F 7/00 |
| | | | | 701/1 |
| 2014/0365126 | A1* | 12/2014 | Vulcano | G01C 21/3679 |
| | | | | 701/538 |
| 2015/0334171 | A1* | 11/2015 | Baalu | H04L 67/12 |
| | | | | 709/203 |
| 2016/0034238 | A1* | 2/2016 | Gerlach | G06F 3/1423 |
| | | | | 345/1.1 |
| 2016/0212254 | A1 | 7/2016 | Akama et al. | |
| 2016/0270144 | A1* | 9/2016 | Thanayankizil | H04B 1/3822 |
| 2016/0352886 | A1* | 12/2016 | Dickow | H04M 1/724098 |
| 2018/0349298 | A1* | 12/2018 | Onohara | H04W 4/48 |
| 2019/0206112 | A1 | 7/2019 | Vaganov | |
| 2019/0265884 | A1* | 8/2019 | Penilla | G06Q 20/3274 |
| 2019/0391780 | A1* | 12/2019 | Song | H04L 67/75 |
| 2020/0210135 | A1* | 7/2020 | Zhu | G06F 3/048 |
| 2021/0097955 | A1* | 4/2021 | Nicholson | G01J 3/0202 |
| 2022/0229624 | A1 | 7/2022 | Xiong et al. | |
| 2022/0236790 | A1 | 7/2022 | Sun et al. | |

FOREIGN PATENT DOCUMENTS

| | | |
|---|---|---|
| CN | 107493375 A | 12/2017 |
| CN | 108259665 A | 7/2018 |
| CN | 108874342 A | 11/2018 |
| CN | 109889885 A | 6/2019 |
| CN | 109933388 A | 6/2019 |
| CN | 110221798 A | 9/2019 |
| CN | 110347305 A | 10/2019 |
| CN | 110641382 A | 1/2020 |
| CN | 110708086 A | 1/2020 |
| CN | 110737487 A | 1/2020 |
| CN | 110769394 A | 2/2020 |
| CN | 111447323 A | 7/2020 |

* cited by examiner

APPLICATION DISPLAY CONTINUING METHOD AND DEVICE

CROSS-REFERENCE TO RELATED APPLICATIONS

This application is a National Stage of International Application No. PCT/CN2021/081019 filed on Mar. 16, 2021, which claims priority to Chinese Patent Application No. 202010203441.7, filed on Mar. 20, 2020, both of which are hereby incorporated by reference in their entireties.

TECHNICAL FIELD

This application relates to the in-vehicle field, and in particular, to an application display continuing method and a device in a mobile phone-vehicle connectivity scenario.

BACKGROUND

In modern society, as mobile phone technologies and connection technologies develop, a case in which people use mobile phones during driving is becoming increasingly common. In most cases, a user may usually use a mobile phone during driving in a plurality of scenarios such as navigation, making a call, performing media playing, or listening to music. Among scenarios in which a mobile phone is used during driving, navigation is the most frequent one, followed by answering a call during driving. In addition, usage scenarios with a relatively high frequency further include listening to music, making a call, and the like. Furthermore, when mobile phones are used during driving, most users choose to connect the mobile phones to vehicles by using Bluetooth, an in-vehicle auxiliary (auxiliary, AUS) interface, or the like, to cooperatively use the mobile phones and in-vehicle devices. Only a few users choose to use a mobile phone independently or use an in-vehicle device independently. It can be learned that in daily life, using a mobile phone and connecting the mobile phone to an in-vehicle device has become very common during driving.

In a mobile phone-vehicle connectivity scenario, a key application scenario is application continuation. The application continuation means that when an application is in use, the application is switched from a terminal device of a user to an in-vehicle device of the user, and normal use of the application is not interrupted due to device switching. The application continuation includes display continuation, audio continuation, and the like. The display continuation may ensure that content displayed on the application is not interrupted when being switched from the terminal device to the in-vehicle device for displaying, and the audio continuation may ensure that audio of the application is not interrupted when being switched from the terminal device to the in-vehicle device for playing. The terminal device does not include an in-vehicle device. When a user performs navigation, makes a voice call, or watches audio or a video on a mobile phone, if the mobile phone is connected to an in-vehicle device, ensuring that an application program continues playing or navigation after the application is switched to an in-vehicle screen of the in-vehicle device is a very important research direction. However, in an existing solution, application continuation can only be implemented in a limited number of applications. For other applications, application continuation cannot be implemented in a mobile phone-vehicle connection process.

SUMMARY

Embodiments of this application provide an application display continuing method and a device. Display continuation of a plurality of third-party applications from a terminal device to an in-vehicle device can be implemented, which meets use continuity for a user and is convenient for the user.

According to a first aspect, an application display continuing method is provided. The method is applied to a terminal device, the terminal device is connected to an in-vehicle device in a wired or wireless manner, a first application and at least one second application run on the terminal device, and the method includes: sending, by the first application, a first broadcast to the at least one second application, so that the at least one second application sends a second broadcast based on the first broadcast; receiving a second broadcast sent by the at least one second application, where the second broadcast includes first data information of the second application; generating, based on the first data information, a card corresponding to the second application, and displaying the card on the in-vehicle device; and when a user taps the card corresponding to the second application, displaying content of the second application on the in-vehicle device with reference to the first data information of the second application.

In a possible implementation, the method further includes: The first application sends at least one third broadcast to the at least one second application, to notify the at least one second application that the card is successfully added.

In a possible implementation, the method further includes: receiving at least one fourth broadcast sent by the at least one second application, where the fourth broadcast includes second data information of the second application; and updating, based on the second data information of the second application, the content that is of the second application and that is displayed on the in-vehicle device.

In a possible implementation, the method further includes: receiving at least one fifth broadcast sent by the at least one second application, where the fifth broadcast includes third data information of the second application; and removing, based on the third data information of the second application, the card that corresponds to the second application and that is displayed on the in-vehicle device.

In a possible implementation, the method further includes: When the terminal device is disconnected from the in-vehicle device, the first application sends at least one sixth broadcast to the at least one second application, to notify that the card corresponding to the at least one second application is removed.

In a possible implementation, the method further includes: sending a seventh broadcast to the at least one second application, to notify the at least one second application that wired connection or wireless connection between the terminal device and the in-vehicle device is disconnected.

In a possible implementation, the first data information and the second data information include one or more of a card identity of the card corresponding to the second application, a package name of the second application, a card type of the card corresponding to the second application, a priority of the card corresponding to the second application, or content of the second application.

In a possible implementation, the third data information includes one or more of a card identity of the card corresponding to the second application and a package name of the second application.

According to a second aspect, an application display continuing method is provided, the method is applied to a terminal device, a first application, a second application, and a third application run on the terminal device, and the method includes: After the terminal device is connected to an in-vehicle device, the first application sends a first broadcast. After receiving the first broadcast, the second application sends first data information of the second application to the first application. After receiving the first broadcast, the third application sends first data information of the third application to the first application. The first application generates a to-be-displayed interface based on the first data information of the second application and the first data of the third application, the to-be-displayed interface includes a card corresponding to the second application and a card corresponding to the third application, the card of the second application is generated based on the first data information of the second application, and the card of the third application is generated based on the first data information of the third application. The terminal device sends the to-be-displayed interface to the in-vehicle device for displaying.

In a possible implementation, the method further includes: When the card of the second application is added to the to-be-displayed interface, the first application notifies the second application that the card of the second application is successfully added. When the card of the third application is added to the to-be-displayed interface, the first application notifies the third application that the card of the third application is successfully added.

In a possible implementation, the method further includes: The second application sends second data information of the second application to the first application. The first application updates the card of the second application based on the second data information of the second application.

In a possible implementation, the method further includes: receiving, by the first application, a removal message sent by the second application; and removing, based on the removal message, the card that is of the second application and that is displayed on the in-vehicle device.

In a possible implementation, the method further includes: When the terminal device is disconnected from the in-vehicle device, the first application separately sends a removal notification to the second application and the third application, to notify that the card of the second application and the card of the third application are removed.

In a possible implementation, the method further includes: When the terminal device is disconnected from the in-vehicle device, the first application sends a second broadcast to notify the second application and the third application that the connection between the terminal device and the in-vehicle device is disconnected.

In a possible implementation, the first data information of the second application includes one or more of a card identity of the card of the second application, content of the second application, a package name of the second application, a card type of the card of the second application, or a priority of the card of the second application.

In a possible implementation, the removal message includes a card identity of the card of the second application.

According to a third aspect, a terminal device is provided, the terminal device is connected to an in-vehicle device, a first application and at least one second application run on the terminal device, and the terminal device includes a processor configured to be coupled to a memory and read and execute instructions in the memory. When the processor runs, the instructions are executed, so that the terminal device performs any method in the first aspect, the second aspect, or any one of the possible implementations of the first and second aspects.

According to a fourth aspect, a computer-readable storage medium is provided. The computer-readable storage medium stores instructions. When the instructions are run on a terminal, the terminal is enabled to perform any method in the first aspect, the second aspect, or any one of the possible implementations of the first and second aspects.

According to a fifth aspect, a computer program device including instructions is provided. When the computer program device runs on a terminal, the terminal is enabled to perform the method in the first aspect, the second aspect, or any one of the possible implementations of the first and second aspects.

This application discloses an application display continuing method and a terminal device. After the terminal device is connected to an in-vehicle device, a broadcast is sent between an in-vehicle terminal application and a third-party application, so that the third-party application is displayed on a screen of the in-vehicle device in a card form, which implements simultaneous continuation of a plurality of different third-party applications. An original mobile phone interface is inherited, so that a user habit does not need to be changed. In addition, because simultaneous continuation of any type and any quantity of applications can be implemented, convenience of operating different applications on an in-vehicle device is greatly improved.

DETAILED DESCRIPTION OF ILLUSTRATIVE EMBODIMENTS

The following describes the technical solutions in embodiments of this application with reference to the accompanying drawings in the embodiments of this application.

Figure 1:
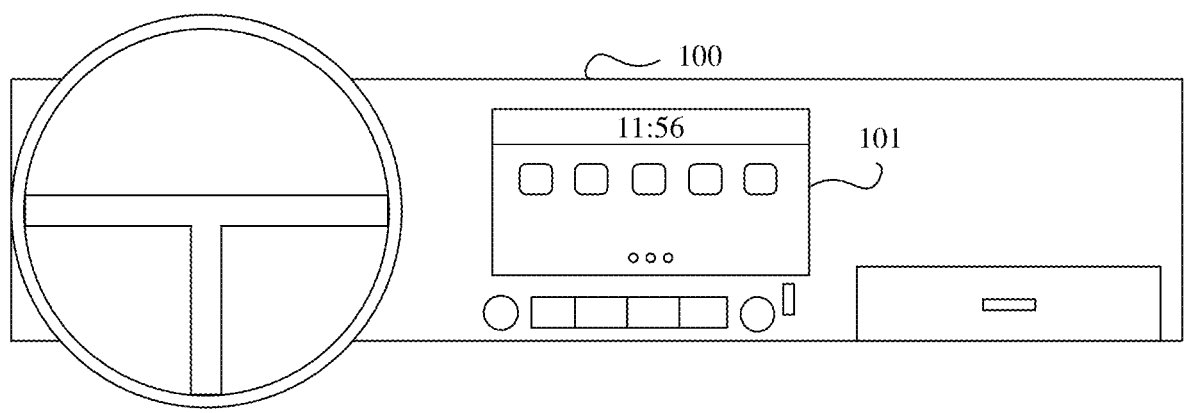
FIG. 1 is a schematic diagram of a scenario according to an embodiment of this application.

This application is mainly applied to a scenario in which a user uses a mobile phone when driving a vehicle, for example, a scenario shown in FIG. 1 as a schematic diagram. It can be learned from FIG. 1 that in an in-vehicle environment, an in-vehicle device 100 has a screen 101. In this scenario, when a user uses a terminal device in the in-vehicle environment, the user may connect the terminal device to an in-vehicle device, so that various applications running on the terminal device are displayed on a screen of the in-vehicle device. In this application, quick continuation of an application (application, APP) on a mobile phone can be implemented after a terminal device is connected to an in-vehicle device, and a series of functions such as calling, navigation, and multimedia playing can continue to be used, which enhances continuity of mobile phone-vehicle interaction and improves user experience. The APP on the mobile phone may include a third-party APP or some APPs developed by mobile phone manufacturers. It may be understood that the APP developed by the mobile phone manufacturer or the third-party APP may be an application that can interact with a user, for example, a music application, a video application, or a map application. Interaction referred to in this application is interaction performed by an APP with a user to meet a use requirement while in use. For interaction between an APP like a setting application or an application store application and a user, continuation may be selectively not implemented by using a whitelist or a blacklist set in a system, that is, the APP like the setting application is not displayed on a screen of an in-vehicle device. There are some APPs that do not interact with the user on the mobile phone. Generally, these APPs do not need to be displayed on the screen of the in-vehicle device. Therefore, an APP that needs to be displayed is used as an example in the following embodiments.

In some solutions, only simple navigation continuation and call continuation are supported. However, if the navigation continuation is, for example, customized continuation for an in-vehicle screen (that is, a screen of an in-vehicle device), such customized continuation is only available for a specific application. For some other applications, because no corresponding activity (activity) life cycle is created for these APPs in an Android system, different applications need to be separately customized to perform continuation of a limited number of interfaces on the in-vehicle screen. In this case, application continuation can be implemented for only a limited number of applications in this solution. Relatively speaking, because a system of an in-vehicle device is relatively closed, continuation of various applications on a terminal device cannot be flexibly handled. In this solution, for applications that can be continued, continuation succeeds for only one single application at a time, instead of a plurality of applications, such as a music application, a navigation application, and a call application, at the same time.

Figure 2:
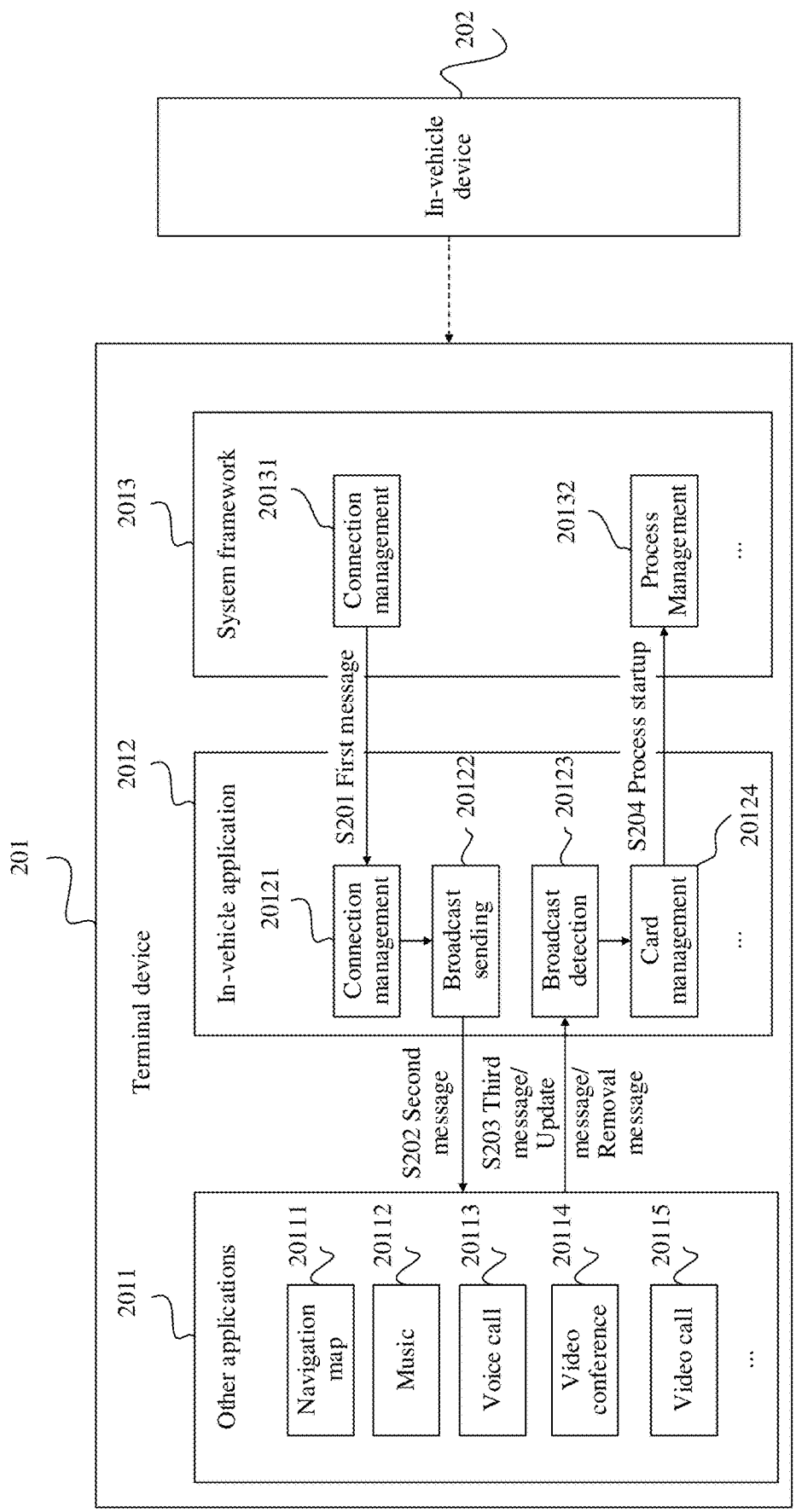
FIG. 2 is a schematic diagram of an application display continuing framework according to an embodiment of this application.

That a terminal device in this application is connected to an in-vehicle device is shown in a schematic diagram of an application display continuing framework in FIG. 2. After a terminal device 201 is connected to an in-vehicle device 202, a system framework layer 2013 of the terminal device 201 is to send a first message (S201) to an in-vehicle APP, to notify the in-vehicle APP 2012 that the terminal device 201 is connected to the in-vehicle device 202. After receiving the first message, the in-vehicle APP 2012 starts to create a to-be-displayed home screen, and sends a second message to one or more other APPs 2011 (continuing APPs). The second message is used to notify the continuing APPs to provide data information of the continuing APPs, and the data information may be used to draw a display interface to implement display continuation. The second message may be sent in a broadcast manner, so that APPs that are running in the terminal device may receive the second message. These running APPs may all be continuing APPs; alternatively, according to a preset setting, some of the running APPs are continuing APPs, and some are not continuing APPs. After receiving the second message, the continuing APPs provide own data information of the continuing APPs for continuation. After receiving the second message, APPs that are not the continuing APP ignore the second message and do not perform processing. It may be understood that the continuing APP 2011 in this application is any APP that is other than the in-vehicle APP 2012 and that may be installed on the terminal device 201, and may be an APP that can interact with a user, for example, a navigation map application 20111, a music application 20112, a voice call application 20113, a video conference application 20114, a video call application 20115, and another application. An APP like a setting application or an application store application of the terminal device can be selected, in a manner of setting a whitelist or a blacklist, to be an APP that is not continued on the in-vehicle device. After receiving the second message, the continuing APP 2011 sends a third message including APP data information of the continuing APP 2011 to the in-vehicle APP (S203). The in-vehicle APP 2012 draws a to-be-displayed home screen of the in-vehicle screen based on third messages sent by the one or more continuing APPs 2011. The drawn to-be-displayed home screen includes information corresponding to the one or more continuing APPs 2011, for example, a card or an icon. Then, the in-vehicle APP 2012 may notify the system framework layer 2013 that the continuing APP 2011 starts a process (S204), so that the system framework layer 2013 performs process management on the continuing APP. The terminal device sends information including the finished to-be-displayed home screen to the in-vehicle device 202, and rendering and displaying are performed after the in-vehicle device 202 receives the information.

The continuing APP 2011 may further send an update message. For example, the update message may carry updated information of the continuing APP 2011, so that after receiving the update message, the in-vehicle APP 2012 updates information of a corresponding continuing APP 2011 on the to-be-displayed home screen based on the update message. After the continuing APP 2011 is closed, a removal message may be further sent to the in-vehicle APP 2012. The in-vehicle APP 2012 removes information of a corresponding other APP 2011 on the to-be-displayed home screen based on the received removal message. It may be understood that, after the in-vehicle device 202 is disconnected from the terminal device 201, the in-vehicle APP 2012 may stop providing the to-be-displayed home screen to the in-vehicle device. In addition to display continuation, application continuation further includes audio continuation. The audio continuation may use a continuing manner in the conventional technology.

The following describes the technical solutions in embodiments of this application with reference to the accompanying drawings in the embodiments of this application.

For ease of description, this application describes this solution in detail by using an example in which a terminal device runs an Android system. By using an Android (android)-based projection technology, different continuing applications are displayed on an in-vehicle device in a card form, a table form, or the like, and simultaneous continuation of a plurality of continuing applications is supported. An operating system running on the terminal device may further include but is not limited to a portable terminal device that carries an iOS operating system, a Microsoft operating system, or another operating system. This is not specifically limited in this embodiment of this application.

Figure 3:
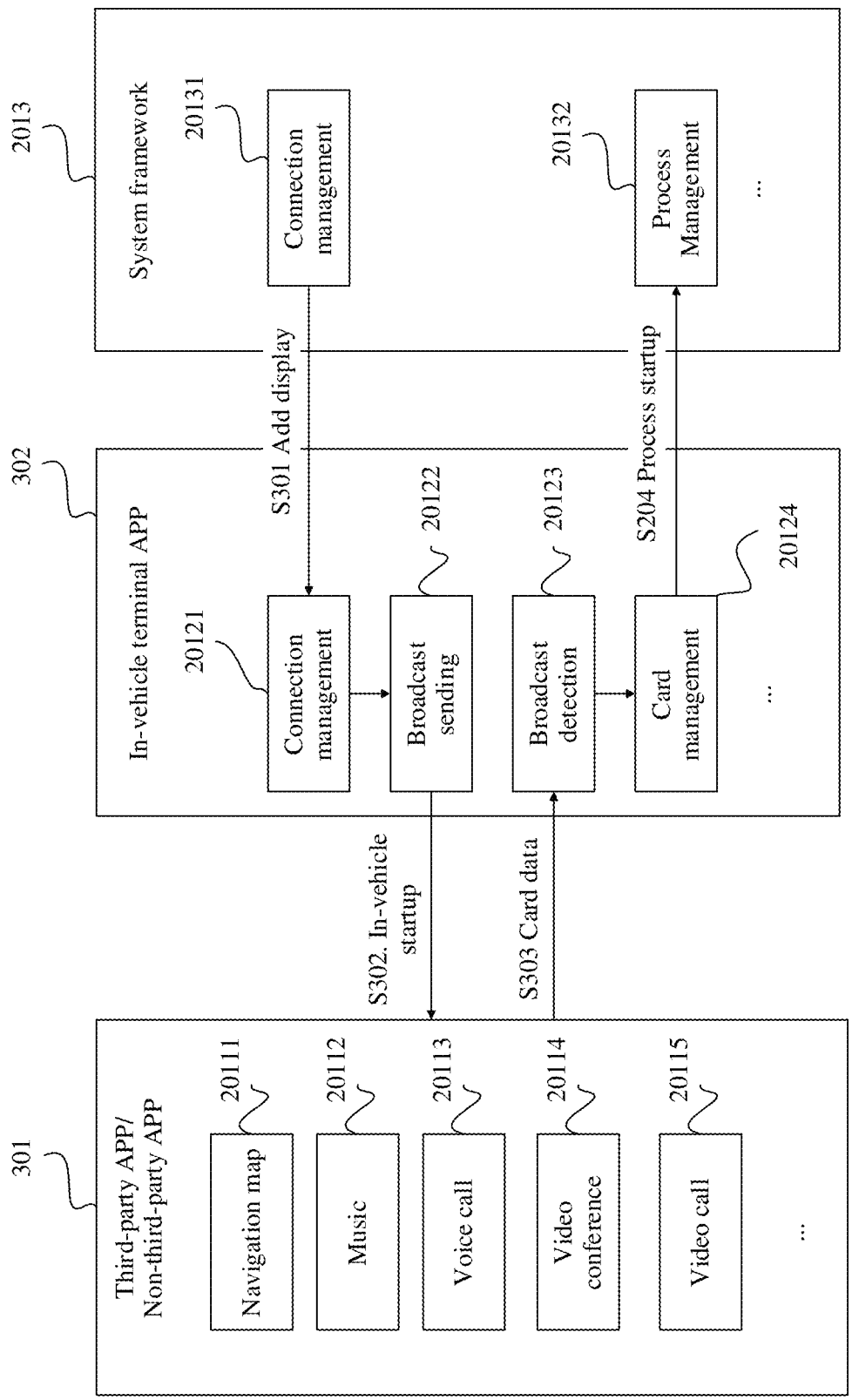
FIG. 3 is a schematic diagram of another application display continuing framework according to an embodiment of this application.

Solutions in this application are mainly applied to a terminal device. The terminal device may be but is not limited to a mobile phone, a wearable device, a tablet computer, a personal digital assistant (personal digital assistant, PDA), a laptop (laptop), a mobile computer, or any other terminal device or portable terminal device. As shown in FIG. 3, this application provides a schematic diagram of another application display continuing framework.

It can be learned from FIG. 3 that, a continuing application (continuing APP) 301 located in a terminal device may interact with an in-vehicle terminal APP 302 by broadcast. The continuing application 301 represents the other APP 2011 in FIG. 2. It may be understood that the continuing application 301 may be a third-party APP or a non-third-party APP, the continuing application 301 is an APP that can interact with a user, and the in-vehicle terminal APP 302 represents the in-vehicle APP 2012 that runs on the terminal device 201 and that is in FIG. 2. The system framework (framework) layer 2013 is the same as the system framework 2013 in FIG. 2, and has functions such as connection management 20131 responsible for monitoring a connection status between a terminal device and an in-vehicle device, virtual screen creation, external screen life cycle management, and process management 20132. The process management 20132 is used to manage closing, starting, or the like of a continuing application process. After that the terminal device is connected to the in-vehicle device is identified by using the connection management 20131, a display add (display add) message is generated (S301) and sent to the in-vehicle terminal APP 302, to enable the in-vehicle terminal APP 302 to prepare a to-be-displayed interface. A person skilled in the art should note that the framework layer is a framework layer of the terminal device, and may also interact with any other APP on the terminal device.

Figure 6:
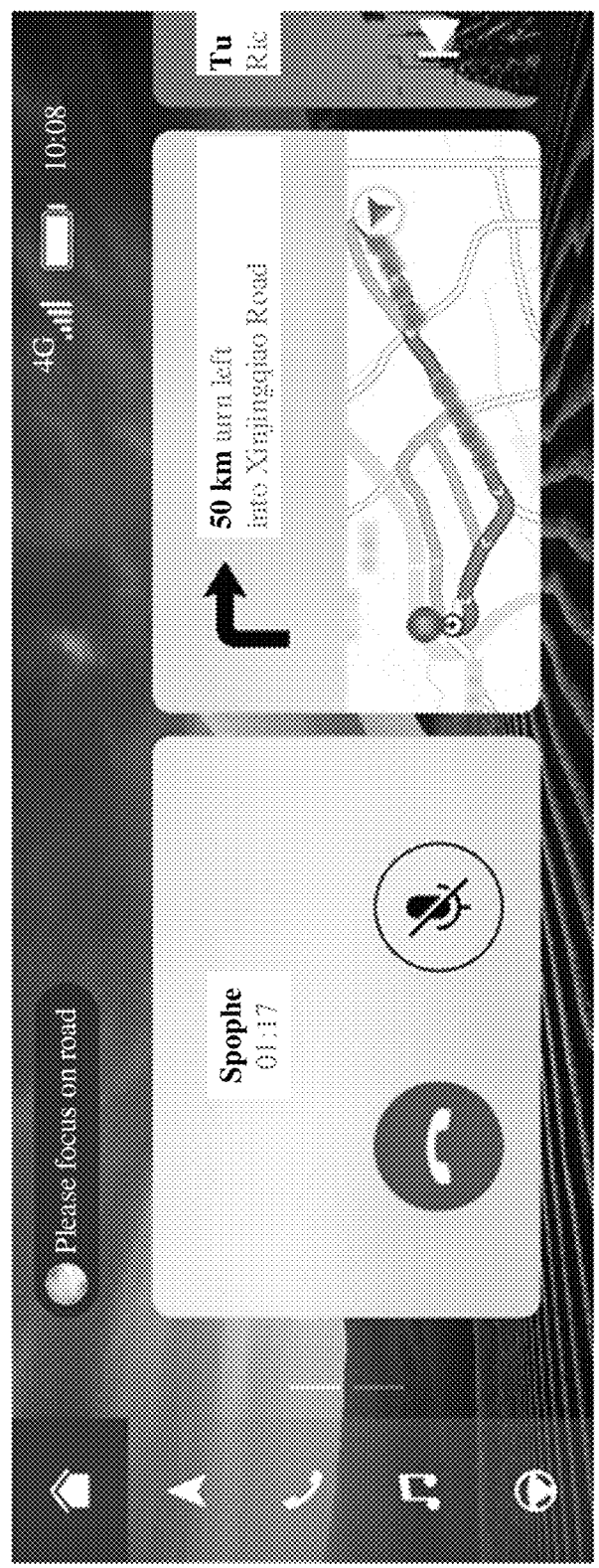
FIG. 6 is a schematic diagram of card displaying on an in-vehicle screen according to an embodiment of this application.

The in-vehicle terminal APP 302 may include a system user interface (system user interface, systemUI) module configured to be responsible for drawing a view (view) like a program dock (dock) bar, a status bar, and a home screen launcher (launcher) that is displayed on an in-vehicle screen of the in-vehicle device, for example, drawing content other than a card in FIG. 6. The in-vehicle terminal APP notifies one or more continuing applications 301 by sending a start (start) broadcast (S302). In this case, the in-vehicle device is turned on, so that the continuing applications 301 send corresponding information in a form of a broadcast to the in-vehicle terminal APP 302 (S303). The corresponding information sent by the continuing applications 301 may be text data, icon data, or card data. After receiving corresponding data sent by the one or more continuing applications 301, the in-vehicle terminal APP 302 generates a to-be-displayed interface of the in-vehicle screen. For example, if the corresponding data is the text data, the corresponding data may be displayed in a table form; if the corresponding data is the icon data, the corresponding data may be displayed in an icon form; or if the corresponding data is the card data, the corresponding data may be displayed in a card form. For the card form, life cycles of a plurality of cards can be managed. If a text box, an icon, or a card is selected and started, this is fed back to the framework layer 2013 of the terminal device for process management.

After detecting a start broadcast sent by the in-vehicle terminal APP 302, any other APP that is except the in-vehicle terminal APP and that runs on the mobile phone sends corresponding information, and may also perform continuation by broadcasting update information corresponding to the continuing application 301. It may be understood that the start broadcast can be detected only when the continuing application 301 is started and runs. For an APP like a setting application or an application store application, because corresponding continuation does not need to be implemented for a user, even after the APP is started and runs, the start broadcast may be ignored after the broadcast is detected. In an example, APP that is of the terminal device and that is to respond and send information corresponding to the APP after the start broadcast is detected is selected in a manner of setting a whitelist or a blacklist.

Figure 4:
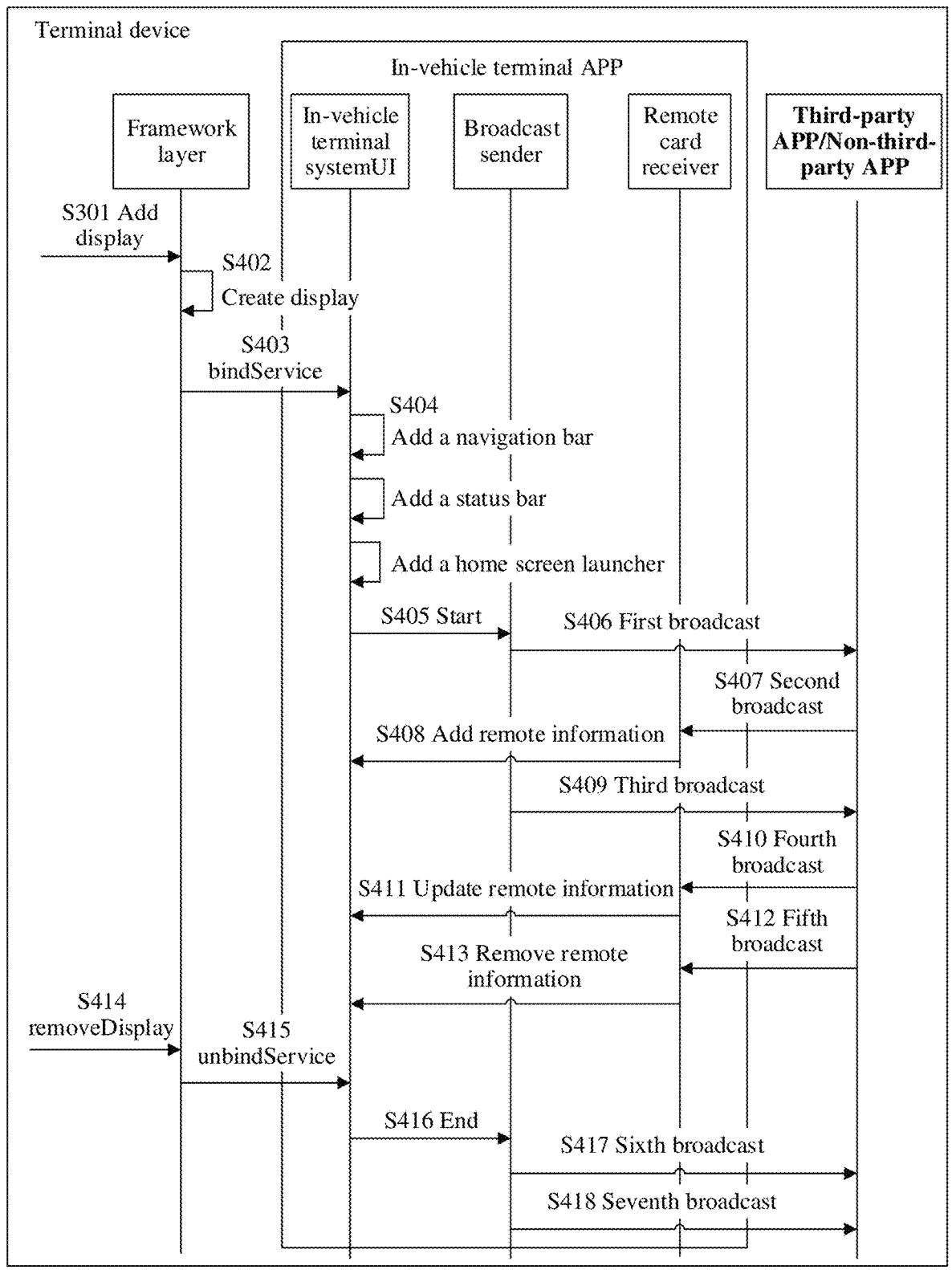
FIG. 4 is an information interaction diagram of application display continuing according to an embodiment of this application.

FIG. 4 is a schematic diagram of information interaction of application display continuation according to an embodiment of this application.

As shown in FIG. 4, a schematic diagram of information interaction of application display continuation is disclosed. FIG. 4 includes three parts: a framework layer, an in-vehicle terminal APP, and a third-party APP. In an example, the in-vehicle terminal APP may include an in-vehicle terminal systemUI, a broadcast sender (broadcast sender), and a remote card receiver (remote card receiver).

Figure 5:
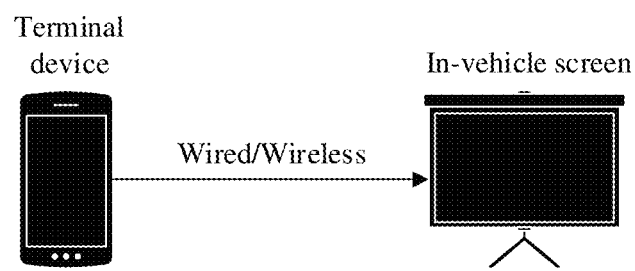
FIG. 5 is a schematic diagram of a connection between a terminal device and an in-vehicle device according to an embodiment of this application.

A person skilled in the art should note that the in-vehicle device in this application is an in-vehicle device with an in-vehicle screen, and the terminal device may migrate, in a wired or wireless link manner, an image of the terminal device to the in-vehicle screen of the in-vehicle device for displaying, as shown in FIG. 5.

In an embodiment, first, the terminal device needs to be connected to the in-vehicle device in a wired or wireless manner, as shown in FIG. 5. It can be learned that the terminal device needs to be connected to the in-vehicle screen of the in-vehicle device in a wired or wireless manner to send information on the terminal device to the in-vehicle screen of the in-vehicle device for displaying. In an example, an in-vehicle terminal application and one or more third-party APPs/non-third-party APPs (continuing APPs) run on the terminal device. After the terminal device is connected to the in-vehicle device, the framework layer of the terminal device receives an instruction (S401). The instruction may be, for example, add display (add display, where add display is an instruction or code of software, similar to the following), which is used to instruct the framework layer to execute create display (create display) (S402), where create display is used to create a to-be-displayed home screen to be displayed on the screen of the in-vehicle device. Then, the framework layer notifies the in-vehicle terminal systemUI to execute add display (S403). For example, a notification message is bindService( ) (bindService( ), and is used to instruct the in-vehicle terminal systemUI to start a corresponding service for executing add display. After receiving bindService( ) the in-vehicle terminal systemUI creates an initial in-vehicle screen interface (S404), including, for example, adding a navigation bar, adding a status bar, and adding a home screen launcher. The in-vehicle terminal systemUI generates the initial in-vehicle screen display interface by performing the foregoing steps. Then, the in-vehicle terminal systemUI calls a start function (S405), for example, onStart( ) to send a first broadcast to the third-party APP/non-third-party APP by using a broadcast sender (broadcast sender) (S406).

The in-vehicle terminal APP and the third-party APP/non-third-party APP perform status and data exchanges mainly by using a broadcast mechanism. The third-party APP/non-third-party APP can adapt to the broadcast mechanism provided by the in-vehicle terminal APP to continue the third-party APP/non-third-party APP from a screen of the terminal device to the in-vehicle screen of the in-vehicle terminal device, and transfer data. In an example, the first broadcast in S406 may be ACTION_CAR_STARTED, a sender of the broadcast is the in-vehicle terminal APP, a receiver may be any APP running on the terminal device, and the first broadcast is used to indicate that the terminal device is connected to the in-vehicle device. It may be understood that, when the first broadcast is sent, the in-vehicle terminal APP group-sends the broadcast, so that every running APP can receive the first broadcast, and send the second broadcast to the in-vehicle terminal APP. It may be understood that the first broadcast notifies the running third-party APP/non-third-party APP that the in-vehicle device is connected and data exchange can be started. The first broadcast does not have additional data, and may be merely broadcast as a message.

After receiving the first broadcast, the at least one third-party APP/non-third-party APP may send a second broadcast to the in-vehicle terminal APP (S407). In an example, a remote card receiver (remote card receiver) may receive the second broadcast. It may be understood that the second board received by the remote card receiver RemoteCard Receiver may be one or more, and this specifically depends on a quantity of the third-party APP/non-third-party APP that sends a second broadcast corresponding to each of the third-party APP or the non-third-party APP. The second broadcast may be ACTION_APP_REMOTE_CARD_ADD, a sender of the broadcast is the third-party APP/non-third-party APP, and the broadcast may carry information that needs to be displayed and that is of the third-party APP/non-third-party APP. Obviously, a receiver is the in-vehicle terminal APP. After receiving the first broadcast message sent by the in-vehicle terminal APP, the third-party APP/non-third-party APP sends a broadcast including information of the third-party APP/non-third-party APP to the in-vehicle terminal APP, so that the in-vehicle terminal APP executes add remote information, for example, draws, on the to-be-displayed home screen of the in-vehicle device, information corresponding to the third-party APP/non-third-party APP. The corresponding information may be displayed in a form of a table, an icon, a card, or the like. The second broadcast includes basic information corresponding to the third-party APP/non-third-party APP, for example, a package name and an identity, and information that needs to be displayed, for example, application data. After receiving at least one second broadcast, RemoteCardReceiver notifies the in-vehicle terminal systemUI to execute add remote card (S408). It may be understood that in S408, the remote card receiver (RemoteCardReceiver) forwards information of the second broadcast to the in-vehicle terminal systemUI.

In an example, the in-vehicle terminal APP may further send a third broadcast to the third-party APP/non-third-party APP by using the broadcast sender BroadcastSender (S409).

The third broadcast may be ACTION_APP_REMOTE_CARD_ADDED, a sender of the broadcast is the in-vehicle terminal APP, and the broadcast may indicate that information corresponding to the third-party APP/non-third-party APP is added to the to-be-displayed interface. One receiver of the third broadcast is one third-party APP/non-third-party APP, and the third broadcast is not group-sent like the first broadcast. It may be understood that, for different third-party APPs/non-third-party APPs, the in-vehicle terminal APP sends different third broadcasts to corresponding third-party APPs/non-third-party APPs by adding, to the third broadcast, information used to indicate a specific APP. The third broadcast sent by the in-vehicle terminal APP may be used as a response message to indicate that the information corresponding to the third-party APP or the non-third-party APP is successfully added to the to-be-displayed home screen of the in-vehicle terminal APP. It may be understood that the third broadcast is used by the in-vehicle terminal APP to feed back an information addition success message to a corresponding third-party APP/non-third-party APP. If a card form is used for displaying on the in-vehicle terminal APP, the third broadcast further includes a card identity corresponding to a card, and is used to distinguish between different cards when there are a plurality of cards. For example, after both a navigation application and a music playing application receive a group-sent first broadcast, the navigation application and the music playing application each send their own second broadcast to the in-vehicle terminal APP. After adding, on the to-be-displayed interface of the in-vehicle screen based on the second broadcast of the navigation application, a card corresponding to the navigation application, the in-vehicle terminal APP sends a third broadcast to the navigation application to notify the navigation application that the card is successfully added. After adding, on the to-be-displayed interface of the in-vehicle screen based on the second broadcast of the music playing application, a card corresponding to the navigation application, the terminal in-vehicle APP sends a third broadcast to the music playing application to notify the music playing application that the card is successfully added.

In an example, by using a first broadcast, a second broadcast, and a third broadcast between the in-vehicle terminal APP and the third-party APP or the non-third-party APP, a process in which the in-vehicle terminal APP loads information corresponding to the third-party APP or the non-third-party APP on a to-be-displayed home screen after a terminal device is connected to an in-vehicle device is implemented. The to-be-displayed home screen is used to be displayed on the in-vehicle screen of the in-vehicle device.

In some examples, the third-party APP or the non-third-party APP is added only when the terminal device begins to be connected to the in-vehicle device, that is, the first broadcast is sent only when the terminal device is just connected to the in-vehicle device. Therefore, the card is added only by using a second broadcast sent by a third-party APP or a non-third-party APP that has received the first broadcast. For example, if the terminal device is a mobile phone, and before the mobile phone is connected to the in-vehicle device, five applications such as applications A, B, C, D, and E simultaneously run on the mobile phone, after the mobile phone is connected to the in-vehicle device, information, such as a table, an icon, or a card, separately corresponding to the applications A, B, C, D, and E is also generated. However, if a new application like an application F is started in the mobile phone after the connection, information corresponding to the application F is no longer generated. In some other examples, if a user returns to a home screen from an application by performing a specific operation on the in-vehicle screen of the in-vehicle device, the in-vehicle terminal APP may repeat the foregoing step of sending the first broadcast, and re-receive a new second broadcast, to redraw a to-be-displayed home screen, which ensures update of an application type or an application quantity on the to-be-displayed home screen. For example, an APP is displayed on the in-vehicle screen. After a user taps a return button, an image displayed on the in-vehicle screen changes from the APP to the home screen. In this case, the first broadcast to the third broadcast may be repeated to redraw a to-be-displayed home screen, to ensure that when the APP is used, if a user newly starts an application F on the terminal device, information corresponding to the application F may be displayed on the to-be-displayed home screen. For example, a new application F is added to the table, or a new icon F is added, or a card of the newly added application F is added.

In an embodiment, the second broadcast carries information corresponding to the third-party APP/non-third-party APP. In an example, the information may be text information, icon information, or card information. Card information is used as an example. An information format of the card information may be shown in Table 1.

TABLE 1

| Key (key) | Type | Description |
|---|---|---|
| cardID | IntExtra | Unique card identity |
| packageName | StringExtra | Third-party APP package name, used to generate a card title |
| cardType | IntExtra | Card type |
| priority | IntExtra | Sequencing priority |
| remote Views | ParcelableExtra | Card content |

Android provides an intent (intent) mechanism to assist interaction and communication between applications, and the card information format shown in Table 1 provides relatively specific broadcast intent content.

The broadcast format may include: a card identity (cardidentity, cardID), where a data type of the card identity is an integer IntExtra, and the card identity is used to indicate a unique identity of the card; a package name (package name), where the package name indicates a package name of the third-party APP/non-third-party APP, a data type of the package name is a string StringExtra, and the package name may be used to generate a title of the card, for example, music, a call, a map, or another name; a card type (card type), where a data type of the card type is an integer IntExtra, and the card type is used to indicate a type of an application corresponding to the card, for example, a notification, a button, or an application refreshed in real time; a priority (priority), where a data type of the priority is an integer IntExtra, and the priority is used to indicate a display priority of the card on the in-vehicle screen of the in-vehicle device, for example, a card with a high priority is preferentially displayed; and a remote view (remote view), where a data type of the remote view is a complex data type ParcelableExtra, and the remote view is used to indicate all content that needs to be displayed by the card, for example, music data, video data, call data, and map data, such as content of an audio player interface, content of a video player interface, content of a call interface, and content of a navigation interface. In an example, in the foregoing card types, the notification may indicate that an application corresponding to the card may be an application of a schedule information type; the button may indicate that an application corresponding to the card may be a voice call application, a music application, or a video application; and the application refreshed in real time may indicate that an application corresponding to the card may be an application like a map navigation application or a star watching application. It may be understood that at least card content and the card identity are included, and the card identity may be replaced by the package name.

It may be understood that when the information corresponding to the third-party APP/non-third-party APP displayed on the in-vehicle device is text information or icon information, no card ID or card type is required. Icon information may include any related information that may be required, such as an icon ID and an icon type.

The following returns to FIG. 4. When content of the information that corresponds to the third-party APP/non-third-party APP and that is generated by the in-vehicle terminal APP needs to be updated, S410 may be performed. For example, the third-party APP or the non-third-party APP is to send a fourth broadcast to the in-vehicle terminal APP, and the RemoteCardReceiver in the in-vehicle terminal APP receives the fourth broadcast. It may be understood that as is similar to the second broadcast, the fourth broadcast may be one or more, and this specifically depends on a quantity of different third-party APPs/non-third-party APPs that need to update cards corresponding to the third-party APPs/non-third-party APPs and send fourth broadcasts corresponding to the third-party APPs/non-third-party APPs. The fourth broadcast may be ACTION_APP_REMOTE_CARD_UPDATE, a sender of the broadcast is the third-party APP/non-third-party APP, and the in-vehicle terminal APP is a receiver. The broadcast carries corresponding display content that is to be updated on the to-be-displayed home screen and that is of the third-party APP or the non-third-party APP. If a card form is used for displaying, the fourth broadcast includes a card ID corresponding to a card and data information that needs to be displayed after the card is updated. If another form is used for displaying, like a table or an icon, no card ID is required. For example, when an icon form is used, any other information that may be required, such as an icon ID, may be further included. After receiving at least one fourth broadcast, RemoteCardReceiver in the in-vehicle terminal APP notifies the in-vehicle terminal systemUI to execute update remote card (update remote card) (S411).

In an example, for the fourth broadcast sent during update, if a card form is used for displaying, a card format used to update card intent content is the same as the card format shown in Table 1. For ease of description, details are not described herein again.

In an example, for adding and updating a card, the third-party APP or the non-third-party APP in this application sends information such as a pending intent (pending intent) and a card view to the in-vehicle terminal APP by using RemoteView, so that the in-vehicle terminal APP draws corresponding information on a launcher, and then performs display on the in-vehicle screen.

RemoteView is a native Android mechanism. In this application, RemoteView is used to encapsulate a current APP status, and refresh an APP status by using a broadcast mechanism. For example, music that is being played, navigation that is being performed, and information of an ongoing call. A user can conveniently browse information of each application by using a card list displayed on the in-vehicle screen. For example, FIG. 6 is a schematic diagram of card display on an in-vehicle screen. In addition, PendingIntent information is encapsulated in RemoteView. The PendingIntent information includes data required for continuation. When a user taps a corresponding card on the in-vehicle screen, seamless continuation can be implemented by using the information encapsulated in PendingIntent, for example, navigation continuation, music continuation, conference continuation, or another use scenario. It may be understood that, for updating information of the third-party APP or the non-third-party APP, after a user taps the corresponding card on the in-vehicle screen, data update is performed for the tapped card. In some examples, if an APP on the in-vehicle screen is being used, for another APP in a background, data may also be periodically or aperiodically updated.

PendingIntent is also a native Android mechanism. In this application, PendingIntent is mainly used to store information of the third-party APP or the non-third-party APP, and complete corresponding application continuation. In a current Android framework, when an application process is displayed on an in-vehicle screen, a process of a third-party APP or a non-third-party APP on a terminal device needs to be killed, and PendingIntent is used as a carrier of application status information for continuation when the process of the third-party APP or the non-third-party APP is started by using an in-vehicle terminal APP. That is, the in-vehicle terminal APP starts the third-party APP or the non-third-party APP whose process is killed and loads information of PendingIntent to the third-party APP or the non-third-party APP. For example, the third-party APP or the non-third-party APP is a navigation application, the information of PendingIntent is information like a start point, an end point, a current location, and a direction of the navigation application. When the navigation application is restarted, the information of PendingIntent is loaded, so that content of the navigation application can be displayed on the in-vehicle screen without interruption. If the Android framework is not used, a process may not need to be killed, and corresponding information of a third-party APP or a non-third-party APP loaded on the in-vehicle screen may be controlled according to a corresponding specification of a used system.

In an example, after the in-vehicle terminal APP finishes drawing the to-be-displayed home screen, the drawn information is transferred to the in-vehicle device in a wired or wireless manner. In this way, the in-vehicle device receives the information transferred by the terminal device, and renders the received information, so that the information is displayed on the in-vehicle screen of the in-vehicle device.

Figure 7A:
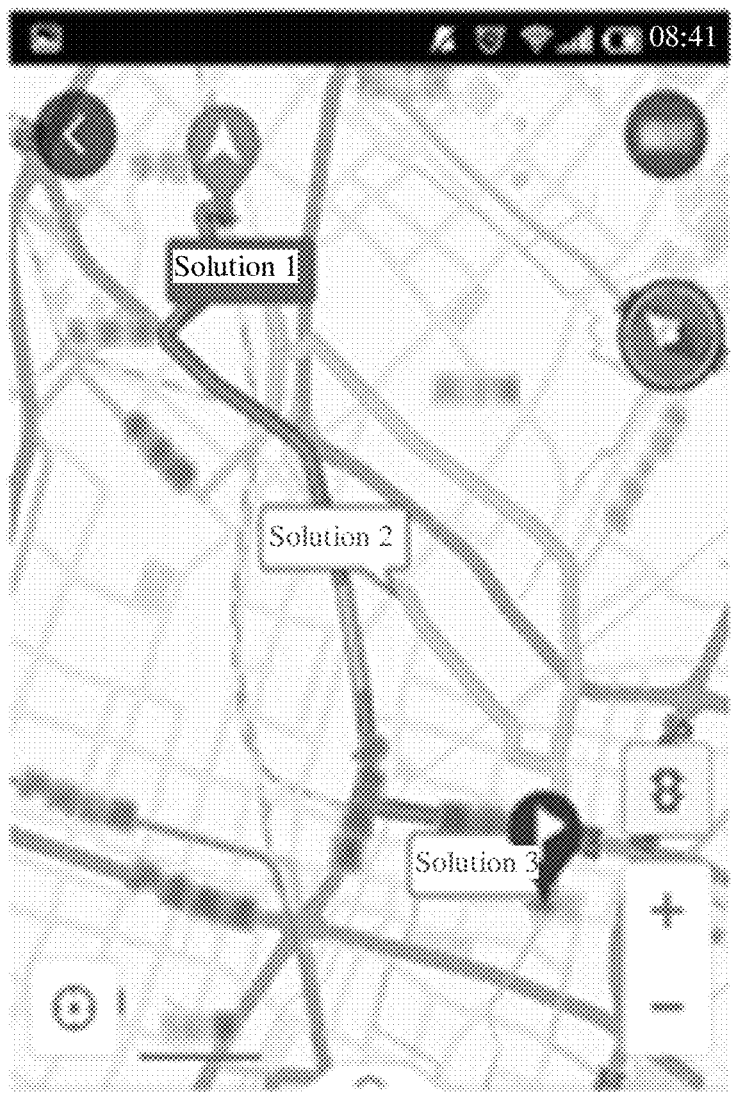
FIG. 7A to FIG. 7C are a schematic diagram of effect of application continuation according to an embodiment of this application.
Figure 7A:
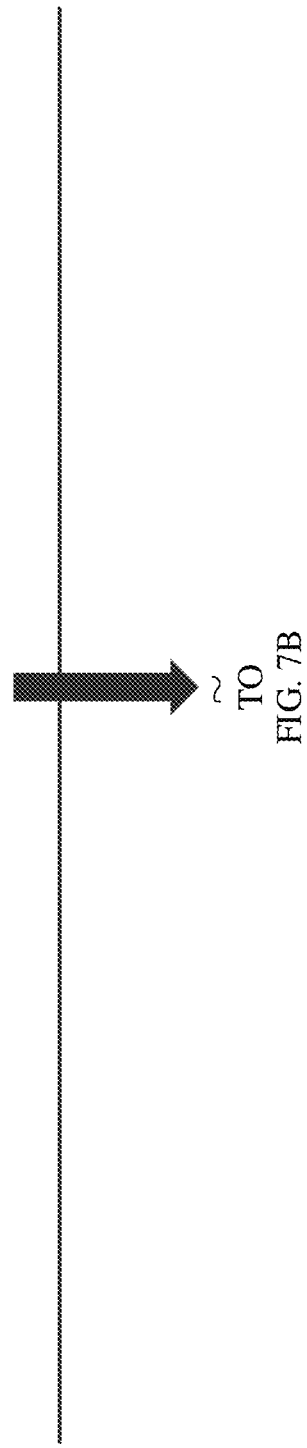
Figure 7B:
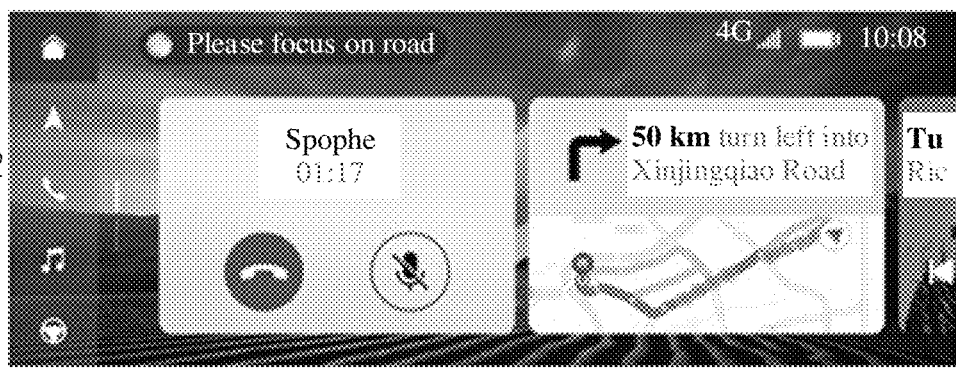
Figure 7C:
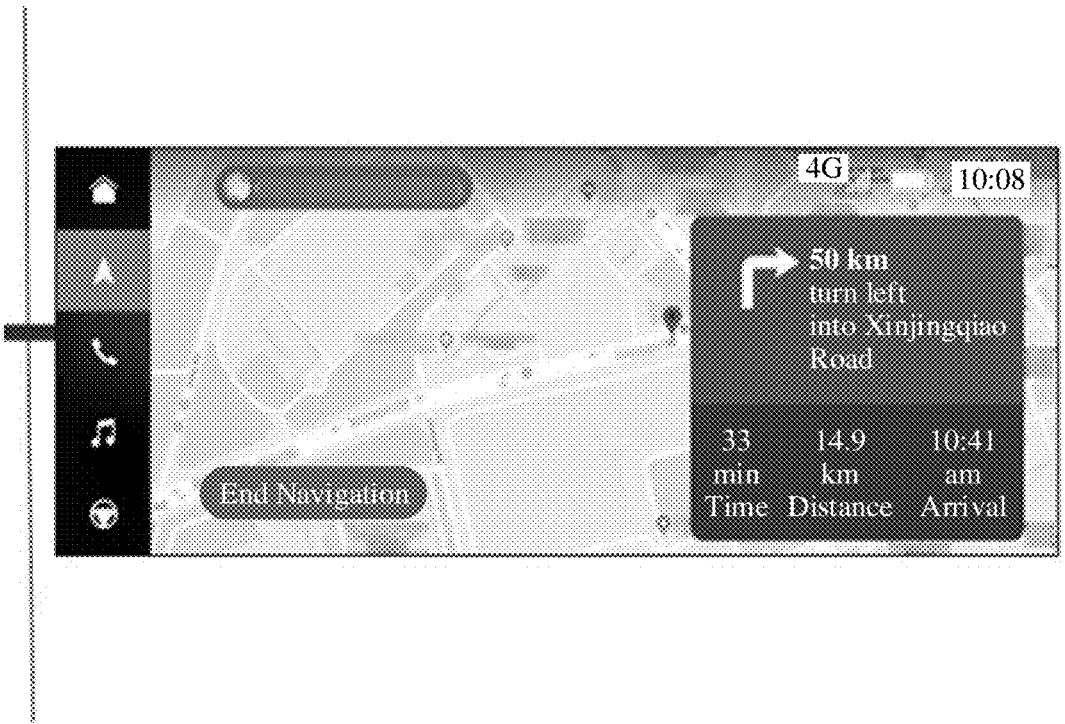

In this application, in the foregoing manner, different applications may be continued from a terminal device to an in-vehicle screen of an in-vehicle device for displaying. For example, FIG. 7A to FIG. 7C are a schematic diagram of effect of application continuation. It can be seen that a map navigation application interface displayed on a terminal device is on the leftmost side of FIG. 7A. Following the arrow, a middle of the FIG. 7B shows a multi-card interface on an in-vehicle screen. A user may browse cards of a plurality of applications by using the interface. When the user taps a card corresponding to the navigation map application, according to indication of the arrow, as shown on the rightmost side of FIG. 7C, more detailed content corresponding to the card is displayed on the in-vehicle screen, and navigation of the terminal device before continuation is carried on. In this way, a user can perform seamlessly continuation in use, thereby greatly improving use convenience and user experience.

Figure 8A:
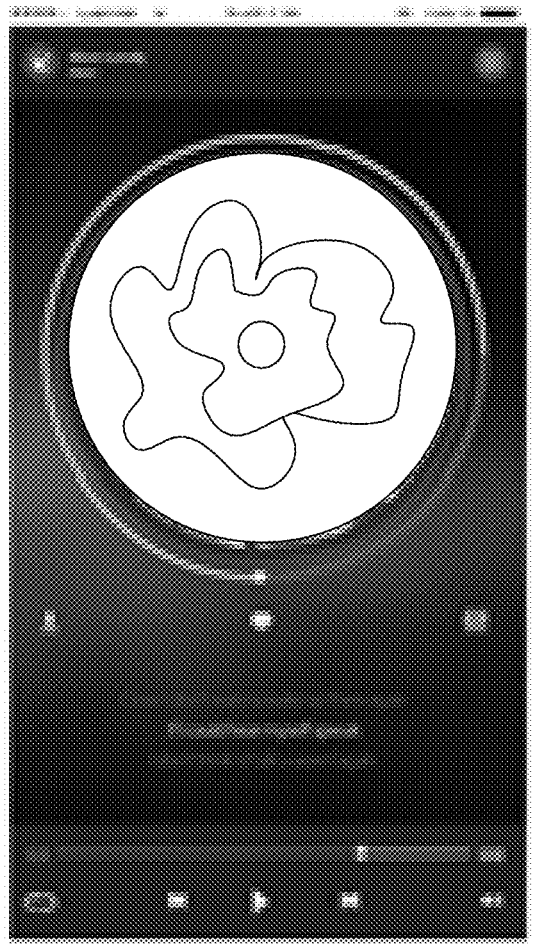
FIG. 8A to FIG. 8C are a schematic diagram of effect of another application continuation according to an embodiment of this application.
Figure 8A:
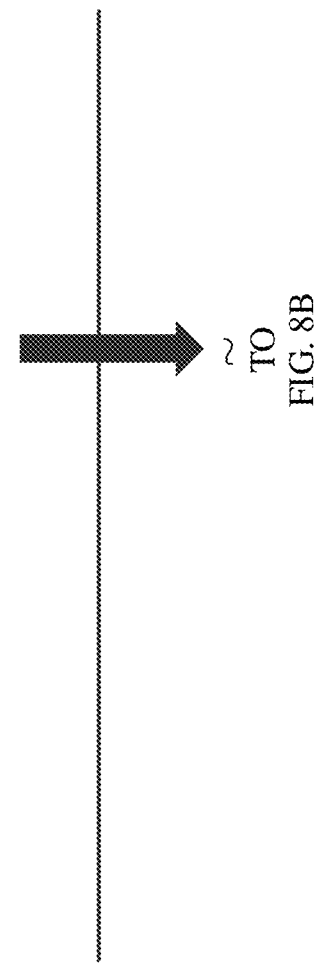
Figure 8B:
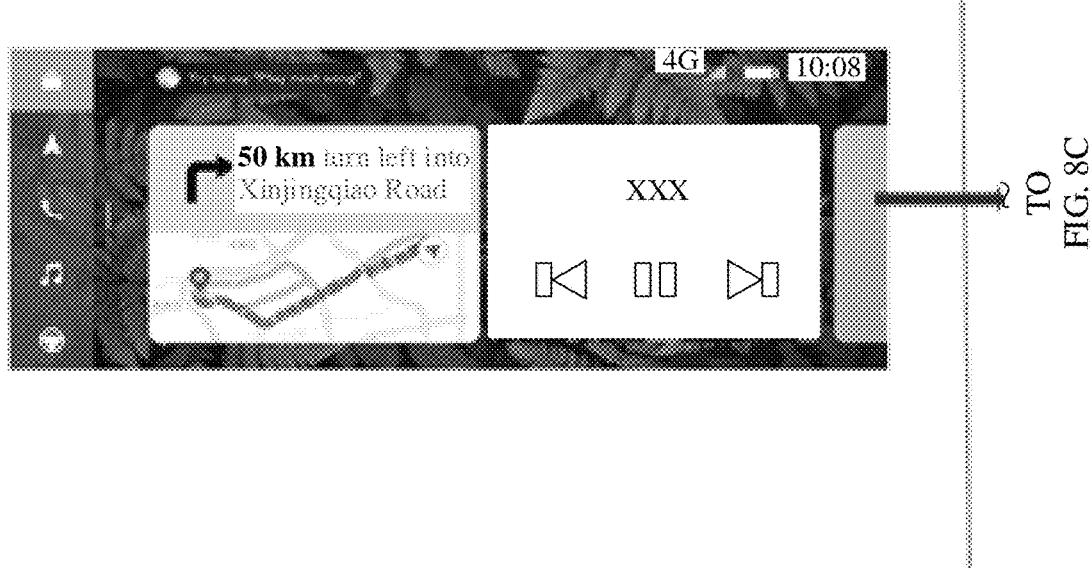
Figure 8C:
Figure 8C:
Figure 8C:
Figure 8C:
Figure 8C:

Similarly, FIG. 8A to FIG. 8C are a schematic diagram of effect of another application continuation. As shown on the left side of FIG. 8A, on a terminal device, a music player plays music in a foreground, and a navigation application and a social application run in a background. After the terminal device is connected to an in-vehicle device, in a multi-card interface on an in-vehicle screen shown in a middle of FIG. 8B, a plurality of cards respectively correspond to the music player, the navigation application, and the social application (not completely shown in FIG. 8A to FIG. 8C). When a user taps a card indicating music playing, as shown on the rightmost side of FIG. 8C, more detailed content corresponding to the card is displayed on the in-vehicle screen, and music played by the terminal device before continuation continues to be played, which achieves a seamless continuing effect. In this way, the music the user listens to may continue to be controlled to play on the in-vehicle device.

It may be understood that, for the effects shown in FIG. 7A to FIG. 7C and FIG. 8A to FIG. 8C, in some embodiments, after a terminal device is connected to an in-vehicle device in a wired or wireless manner, the terminal device may perform authentication on the in-vehicle device. Only after the in-vehicle device is authenticated, the terminal device sends a to-be-displayed interface to a screen of the in-vehicle device for displaying.

In some examples, for the to-be-displayed interface drawn by the terminal device, if a third-party APP or a non-third-party APP has display resources of a different specification, a terminal device may draw, with reference to a display resource of a corresponding APP, a card corresponding to the application. For example, if a third-party APP or a non-third-party APP carries landscape display resources, after a terminal device is connected to an in-vehicle device, a card corresponding to the application may be drawn on a to-be-displayed interface in a landscape manner based on the landscape display resources carried by the third-party APP or the non-third-party APP. If a third-party APP or a non-third-party APP carries customized display resources for an in-vehicle screen, a card may be drawn by using display resources of an in-vehicle screen based on the customized display resources carried by the third-party APP or the non-third-party APP. The display resources include one or more display elements such as an interface background, an icon, space, and an interface layout.

In this application, application continuation is performed in a card display manner, which helps a user operates more intuitively and efficiently.

Return to FIG. 4. When the third-party APP or the non-third-party APP is closed by a user on the terminal device, a fifth broadcast may be sent to the in-vehicle terminal APP, and RemoteCardReceiver in the in-vehicle terminal APP receives the fifth broadcast (S412). It may be understood that, as is similar to the second broadcast and the fourth broadcast, the fifth broadcast may be one or more, and this specifically depends on a quantity of different third-party APPs or non-third-party APPs that need to remove information corresponding to the third-party APPs or the non-third-party APPs from the in-vehicle screen, and to separately send fifth broadcasts corresponding to the third-party APPs or the non-third-party APPs. For example, the fifth broadcast may be ACTION_APP_REMOTE_CARD_REMOVE, a sender of the broadcast is a third-party APP or a non-third-party APP, and a receiver may be the in-vehicle terminal APP. The broadcast indicates that the third-party APP or the non-third-party APP is to actively remove information that corresponds to the third-party APP or the non-third-party APP and that is displayed on the in-vehicle screen, and therefore the third-party APP or the non-third-party APP sends the fifth broadcast to the in-vehicle terminal APP. In this way, remote information is removed (S413).

When the information corresponding to the APP is displayed on the in-vehicle screen in a card form, the fifth broadcast includes a card ID corresponding to a card that needs to be removed. If another form like a table or an icon is used for displaying, no card ID is required. For example, when an icon form is used, any other information that may be required, such as an icon ID, may be further included. It may be understood that the fifth broadcast includes a package name of the application corresponding to the removed card.

It may be understood that, if a user deletes, on the in-vehicle screen, information corresponding to an APP, information of the APP may also be removed. In this case, the in-vehicle device may directly delete the card. Alternatively, the in-vehicle device sends the operation performed by the user on the in-vehicle screen to the corresponding APP on the terminal device. As described in the foregoing solution, the APP sends a fifth broadcast to the in-vehicle terminal APP, to remove the corresponding card. In another example, if the wired or wireless link between the terminal device and the in-vehicle device is interrupted, the in-vehicle terminal APP may remove all cards. In an example, as shown in FIG. 4, when the wired or wireless link between the terminal device and the in-vehicle device is interrupted, for example, a wireless link is interrupted or a connection cable is removed, the terminal device sends an instruction removeDisplay( ) (removeDisplay( ) to the framework layer (S414). After receiving removeDisplay( ) the framework layer instructs the in-vehicle terminal systemUI to perform unbindService( ) (unbindService( ) (S415). After receiving unbindService( ) the in-vehicle terminal systemUI notifies BroadcastSender to end (onEnd( ) (S416). After receiving onEnd( ) BroadcastSender may send a sixth broadcast (S417) and/or a seventh broadcast (S418) to the third-party APP or the non-third-party APP.

In an example, the sixth broadcast may be
ACTION_APP_REMOTE_CARD_REMOVED, a sender of the broadcast is the in-vehicle terminal APP, the broadcast may carry indication information used to indicate the third-party APP or the non-third-party APP, and a receiver may be the third-party APP or the non-third-party APP. It should be noted that, in this case, the receiver of the sixth broadcast is a third-party APP or a non-third-party APP corresponding to a single application. As is similar to the third broadcast, the sixth broadcast is not group-sent like the first broadcast. The sixth broadcast is used to notify the third-party APP or the non-third-party APP that the corresponding information that is displayed on the in-vehicle screen and that is of the third-party APP or the non-third-party APP is removed. If a card form is used for displaying, the sixth broadcast may include a card ID corresponding to a removed card. If another form like a table or an icon is used for displaying, no card ID is required. For example, when an icon form is used, any other information that may be required, such as an icon ID, may be further included.

In another example, the seventh broadcast may be ACTION_CAR_END, and a sender of the broadcast is the in-vehicle terminal APP. It should be noted that the seventh broadcast is similar to the first broadcast as a group-sent broadcast. The seventh broadcast is used by the in-vehicle terminal APP to notify every third-party APP or non-third-party APP that the in-vehicle device is disconnected from the terminal device. It should be noted that the seventh broadcast does not have additional data, and may be merely broadcast as a message.

In still another example, if a display form is a card form, the fifth broadcast or the sixth broadcast may carry information of a removed card. An information format of the card information may be shown in Table 2.

TABLE 2

| Key (key)   | Type        | Description                  |
|-------------|-------------|------------------------------|
| cardID      | IntExtra    | Unique card identity         |
| packageName | StringExtra | Third-party APP package name |

The card information format shown in Table 2 provides relatively specific broadcast intent content of the removed card. The broadcast format may include: cardID, where a data type of cardID is an integer IntExtra, and cardID is used to indicate a unique identity of the card; packageName, where packageName indicates a package name of a third-party APP/non-third-party APP, a data type of packageName is a string StringExtra, and packageName may indicate a specific third-party APP/non-third-party APP to be removed, for example, a name like music, a call, or a map. It may be understood that if a display form is a text form, an icon form, or another form, no card ID is required. Icon information may include any related information that may be required, such as an icon ID.

This application provides an application display continuing method, and any third-party APP or non-third-party APP that has a requirement can be continued by using the method. If an original interface display resource is used, after being started on an in-vehicle screen, a continued application still conforms to a landscape layout or a PAD layout on a terminal device, so that an original form of an original interface of the terminal device is inherited, a use habit of a user does not need to be changed, and use continuity of the user is kept. An interface display resource that adapts to an in-vehicle screen may alternatively be used, to better adapt to display on the in-vehicle screen. In addition, any type and any quantity of applications can be simultaneously continued, thereby ensuring continuity of a plurality of services when a user uses an in-vehicle device, and greatly improving convenience of operating different applications on the in-vehicle device.

A person skilled in the art should note that this application can support continuation of any third-party application that can implement an interface. This application is also applicable to another form of a multi-screen framework. For example, a terminal device continues a screen to a television, a projector, a PAD, to implement cross-screen continuation of a plurality of applications.

Figure 9:
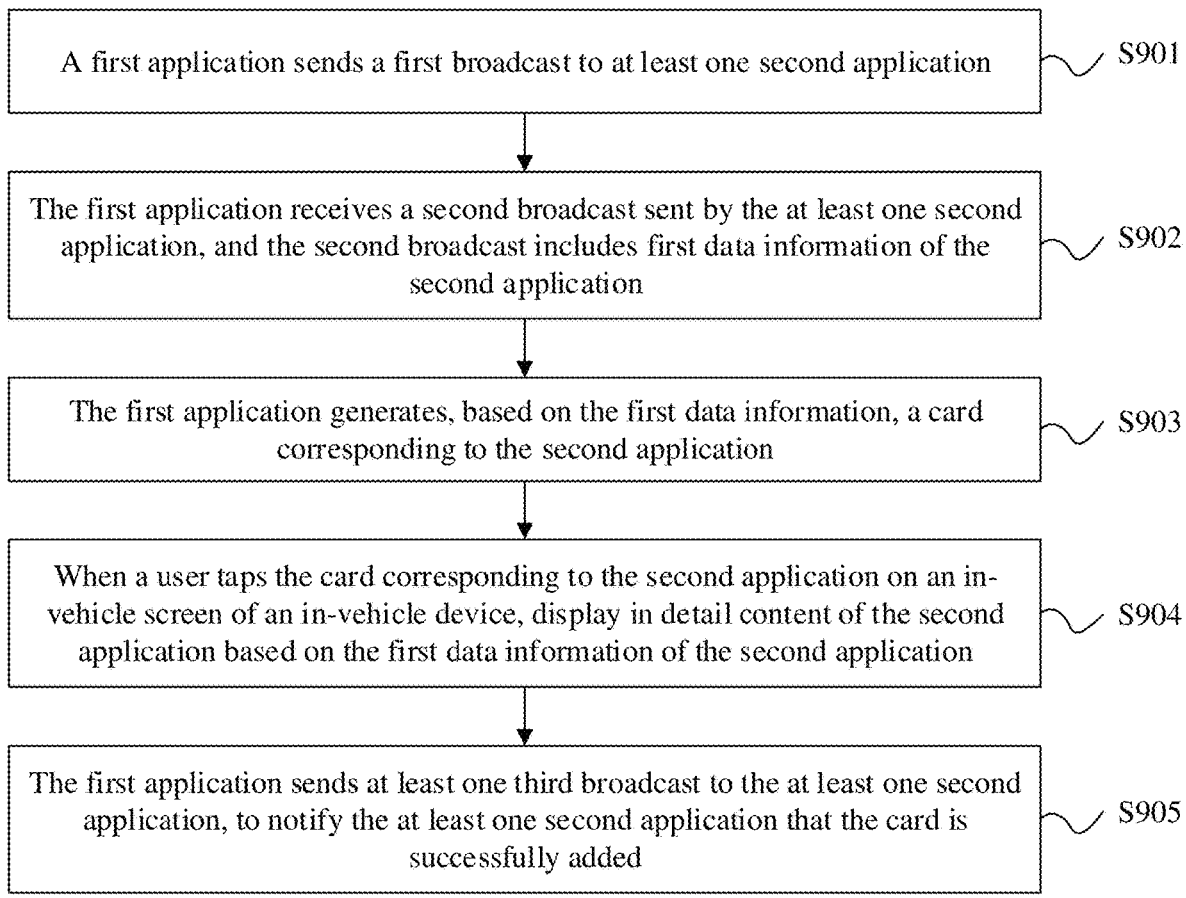
FIG. 9 is a flowchart of an application display continuing method according to an embodiment of this application.

FIG. 9 is a flowchart of an application display continuing method according to an embodiment of this application.

As shown in FIG. 9, this application discloses an application display continuing method. The method is applied to a terminal device, the terminal device is connected to an in-vehicle device in a wired or wireless manner, and a first application and at least one second application run on the terminal device. The first application may be a projection management APP, for example, the foregoing in-vehicle terminal APP. The second application may be the foregoing continuing APP. The method may include the following steps.

S901. A first application sends a first broadcast to at least one second application.

After the first application sends the first broadcast to the at least one second application, the second application sends a second broadcast to the first application based on the first broadcast. The at least one second application may include two applications, for example, a navigation application and a music playing application.

S902. The first application receives a second broadcast sent by the at least one second application, and the second broadcast includes first data information of the second application.

In a possible implementation, the first data information may include one or more of a card identity of a card corresponding to the second application, a package name of the second application, a card type of the card corresponding to the second application, a priority of the card corresponding to the second application, or content of the second application. A person skilled in the art should note that any information may be added based on an actual requirement. For example, the navigation application and the music playing application separately send a second broadcast.

S903. The first application generates, based on the first data information, the card corresponding to the second application, and draws an interface to be displayed on the in-vehicle device. The terminal device sends the to-be-displayed interface to the in-vehicle device for displaying.

S904. When a user taps the card corresponding to the second application on an in-vehicle screen of the in-vehicle device, the in-vehicle device notifies the first application, so that the first application displays content of the second application in detail on the in-vehicle device based on the first data information of the second application.

S905. The first application sends at least one third broadcast to the at least one second application, to notify the at least one second application that the card is successfully added. The second application receives the third broadcast sent by the first application.

Figure 10:
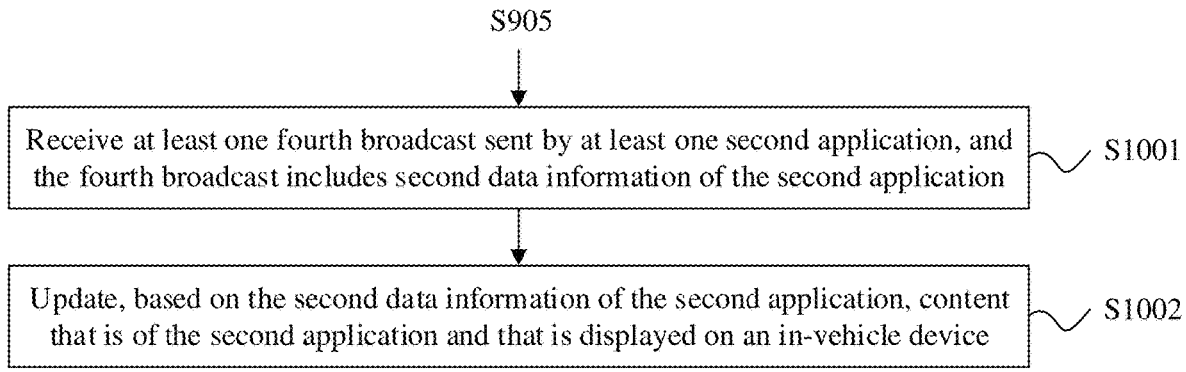
FIG. 10 is a flowchart of another application display continuing method according to an embodiment of this application.

FIG. 10 is a flowchart of another application display continuing method according to an embodiment of this application.

As shown in FIG. 10, this application discloses another application display continuing method. When a second application needs to actively update card content of a card corresponding to the second application, after S905, the method may further include the following steps.

S1001. A first application receives at least one fourth broadcast sent by at least one second application, and the fourth broadcast includes second data information of the second application.

In a possible implementation, the second data information may include one or more of a card identity of a card corresponding to the second application, a package name of the second application, a card type of the card corresponding to the second application, a priority of the card corresponding to the second application, or content of the second application. A person skilled in the art should note that any information may be added based on an actual requirement. The second data information is similar to the first data information.

S1002. The first application updates, based on the second data information of the second application, content that is of the second application and that is displayed on the in-vehicle device.

It may be understood that the update process shown in FIG. 10 may be that after a user taps an APP, when information of the APP is displayed in detail, the APP is separately updated. Another APP running in a background may also be updated in some examples.

Figure 11:
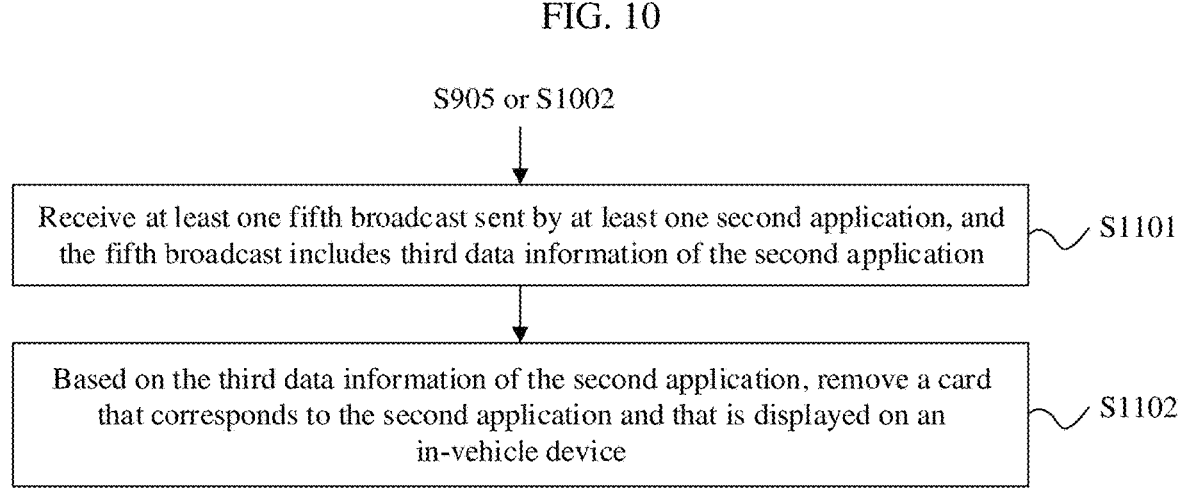
FIG. 11 is a flowchart of still another application display continuing method according to an embodiment of this application.

FIG. 11 is a flowchart of still another application display continuing method according to an embodiment of this application.

As shown in FIG. 11, this application discloses still another application display continuing method. When a second application needs to actively remove a card corresponding to the second application, after S905 or S1002, the method may further include the following steps.

S1101. A first application receives at least one fifth broadcast sent by at least one second application, and the fifth broadcast includes third data information of the second application.

In a possible implementation, the third data information may include one or more of a card identity of a card corresponding to the second application and a package name of the second application. A person skilled in the art should note that any information may be added based on an actual requirement.

S1102. Remove, based on the fifth broadcast, the card that corresponds to the second application and that is displayed on an in-vehicle device.

In a possible implementation, the first application removes, based on the fifth broadcast and the third data information that is of the second application and that is included in the fifth broadcast, the card that corresponds to the second application and that is displayed on the in-vehicle device.

Figure 12:
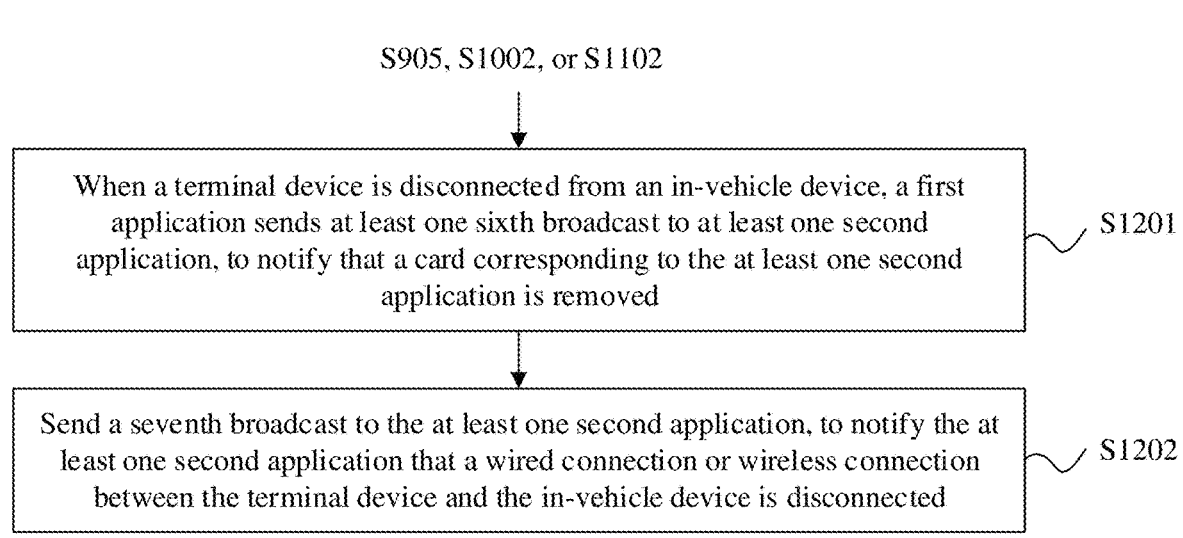
FIG. 12 is a flowchart of yet another application display continuing method according to an embodiment of this application.

FIG. 12 is a flowchart of yet another application display continuing method according to an embodiment of this application.

As shown in FIG. 12, this application discloses yet another application display continuing method. After S905, S1002, or S1102, a terminal device may be disconnected from an in-vehicle device. After the terminal device is disconnected from the in-vehicle device, information corresponding to a second application displayed on an in-vehicle screen is completely removed from an in-vehicle terminal APP, and the method may further include the following steps.

S1201. When a terminal device is disconnected from an in-vehicle device, a first application sends at least one sixth broadcast to at least one second application, to notify that a card corresponding to the at least one second application is removed. It may be understood that the sixth broadcast carries an ID of the card.

S1202. Send a seventh broadcast to the at least one second application, to notify the at least one second application that a wired connection or wireless connection between the terminal device and the in-vehicle device is already disconnected. The seventh broadcast may be a group-sent broadcast, as is similar to the first broadcast.

It may be understood that there is no necessary sequence between S1201 and S1202. Alternatively, S1202 may be performed before S1201. Alternatively, only S1201 or S1202 is performed.

Figure 13:
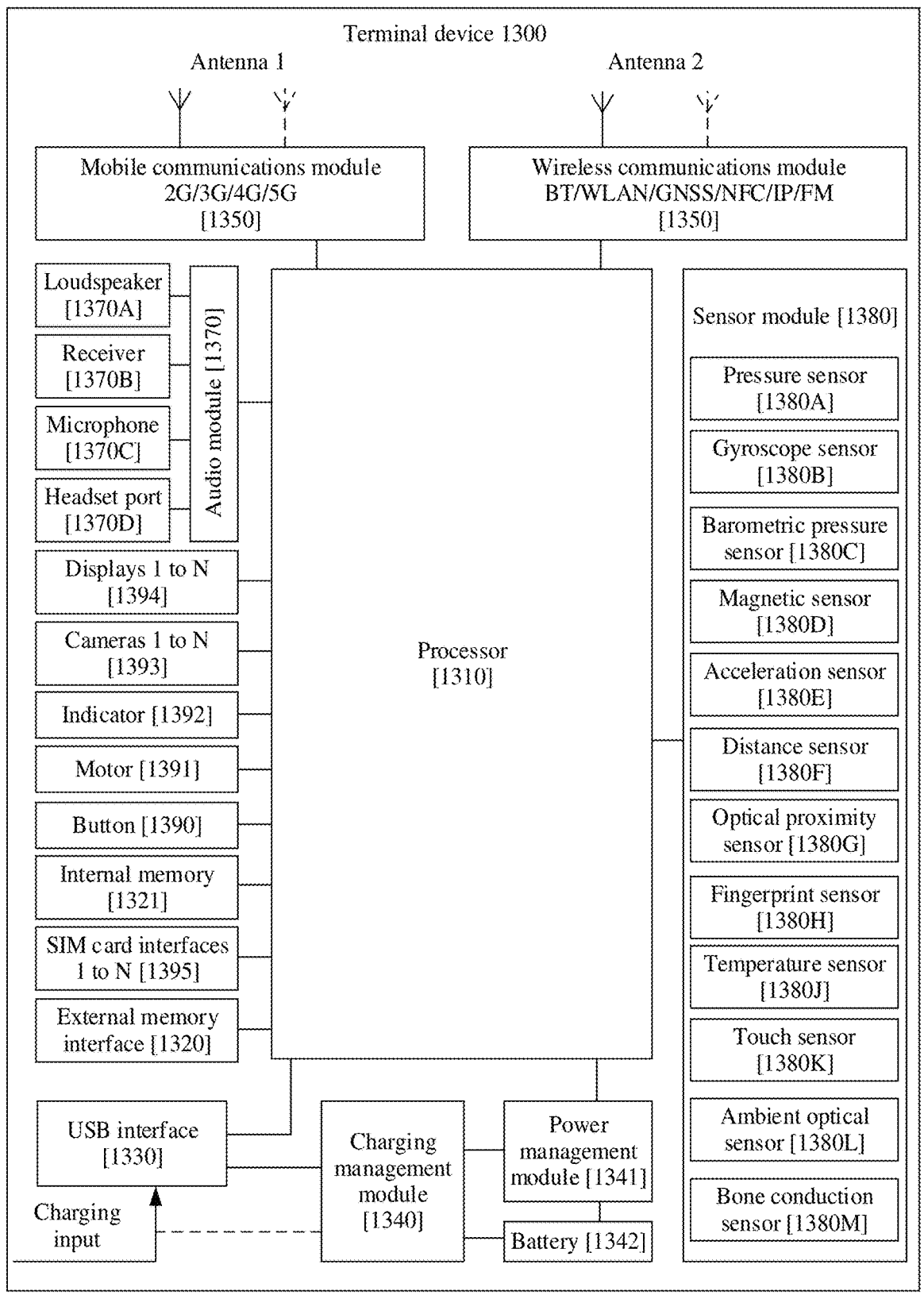
FIG. 13 is a schematic diagram of a terminal device according to an embodiment of this application.

FIG. 13 is a schematic diagram of a terminal device according to an embodiment of this application.

As shown in FIG. 13, a terminal device 1300 is provided. The terminal device 1300 may include a processor 1310, an external memory interface 1320, an internal memory 1321, a universal serial bus (universal serial bus, USB) interface 1330, a charging management module 1340, a power supply management module 1341, a battery 1342, an antenna 1, an antenna 2, a mobile communications module 1350, a wireless communications module 1360, an audio module 1370, a loudspeaker 1370A, a receiver 1370B, a microphone 1370C, a headset port 1370D, a sensor module 1380, a button 1390, a motor 1391, an indicator 1392, a camera 1393, a display 1394, a subscriber identification module (subscriber identification module, SIM) card port 1395, and the like. The sensor module 1380 may include a pressure sensor 1380A, a gyroscope sensor 1380B, a barometric pressure sensor 1380C, a magnetic sensor 1380D, an acceleration sensor 1380E, a distance sensor 1380F, an optical proximity sensor 1380G, a fingerprint sensor 1380H, a temperature sensor 1380J, a touch sensor 1380K, an ambient optical sensor 1380L, a bone conduction sensor 1380M, and the like.

It may be understood that the structure shown in this embodiment of the present invention does not constitute a specific limitation on the electronic device 1300. In some other embodiments of this application, the electronic device 1300 may include more or fewer components than those shown in the figure, or some components may be combined, or some components may be split, or there may be a different component layout. The components shown in the figure may be implemented by hardware, software, or a combination of software and hardware.

The processor 1310 may include one or more processing units. For example, the processor 1310 may include an application processor (application processor, AP), a central processing unit (central processing unit, CPU), a modem processor, a graphics processing unit (graphics processing unit, GPU), an image signal processor (image signal processor, ISP), a controller, a video coder/decoder, a digital signal processor (digital signal processor, DSP), a baseband processor, and/or a neural-network processing unit (neural-network processing unit, NPU). Different processing units may be independent components, or may be integrated into one or more processors.

The processor 1310 may generate an operation control signal based on an instruction operation code and a time sequence signal to control instruction fetching and instruction executing.

A memory may be further disposed in the processor 1310, and is configured to store instructions and data. In some embodiments, the memory in the processor 110 is a cache. The memory may store instructions or data just used or cyclically used by the processor 1310. If the processor 1310 needs to use the instructions or the data again, the processor 1310 may directly invoke the instructions or the data from the memory. This avoids repeated access and reduces waiting time of the processor 1310, thereby improving system efficiency.

In some embodiments, the processor 1310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules that is shown in this embodiment of the present invention is only an example for description, and does not constitute a limitation on the structure of the electronic device 1300. In some other embodiments of this application, the electronic device 1300 may alternatively use an interface connection manner different from that in the foregoing embodiment, or a combination of a plurality of interface connection manners.

The charging management module 1340 is configured to receive charging input from a charger. The charger may be a wireless charger or a wired charger. In some embodiments of wired charging, the charging management module 1340 may receive charging input from a wired charger via a USB interface 1330. In some embodiments of wireless charging, the charging management module 1340 may receive wireless charging input via a wireless charging coil of the electronic device 1300. When charging the battery 1342, the charging management module 1340 may further supply power to the electronic device by using the power supply management module 1341.

The power supply management module 1341 is configured to connect the battery 1342, the charging management module 1340, and the processor 1310. The power supply management module 1341 receives input of the battery 1342 and/or the charging management module 1340, and supplies power to the processor 1310, the internal memory 1321, the display 1394, the camera 1393, the wireless communications module 1360. The power supply management module 1341 may be further configured to monitor parameters such as a battery capacity, a battery cycle count, and a battery health status (electric leakage or impedance). In some other embodiments, the power supply management module 1341 may alternatively be disposed in the processor 1310. In some other embodiments, the power supply management module 1341 and the charging management module 1340 may alternatively be disposed in a same component.

A wireless communication function of the electronic device 1300 may be implemented by using the antenna 1, the antenna 2, the mobile communications module 1350, the wireless communications module 1360, the modem processor, and the baseband processor.

The antenna 1 and the antenna 2 are configured to transmit and receive an electromagnetic wave signal. Each antenna in the electronic device 1300 may be configured to cover one or more communications frequency bands. Different antennas may be multiplexed to improve utilization of the antennas. For example, the antenna 1 may be multiplexed as a diversity antenna of a wireless local area network. In some other embodiments, the antenna may be used in combination with a tuning switch.

The mobile communications module 1350 may provide a wireless communications solution applied to the electronic device 1300 including 2G/3G/4G/5G. The mobile communications module 1350 may include at least one filter, a switch, a power amplifier, a lownoise amplifier (low noise amplifier, LNA), and the like. The mobile communications module 1350 may receive an electromagnetic wave by using the antenna 1, perform processing such as filtering and amplifying on the received electromagnetic wave, and transmit the electromagnetic wave to the modem processor for demodulation. The mobile communications module 1350 may further amplify a signal modulated by the modem processor, and convert, by using the antenna 1, the signal into an electromagnetic wave for radiation. In some embodiments, at least some functional modules in the mobile communications module 1350 may be disposed in the processor 1310. In some embodiments, at least some function modules of the mobile communications module 1350 may be disposed in a same device with at least some modules of the processor 1310.

The wireless communications module 1360 may provide a solution that is applied to the electronic device 1300 and that is to wireless communications including wireless local area networks (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communications module 1360 may be one or more components that integrate at least one communications processor module. The wireless communications module 1360 receives an electromagnetic wave by using the antenna 2, performs frequency modulation and filtering on the electromagnetic wave signal, and sends the processed signal to the processor 1310. The wireless communications module 1360 may further receive a to-be-sent signal from the processor 1310, perform frequency modulation and amplification on the to-be-sent signal, and convert, by using the antenna 2, the signal into an electromagnetic wave for radiation.

In some embodiments, the antenna 1 of the electronic device 1300 is coupled to the mobile communications module 1350, and the antenna 2 is coupled to the wireless communications module 1360, so that the electronic device 1300 may communicate with a network and another device by using a wireless communications technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, and/or an IR technology. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or satellite based augmentation systems (satellite based augmentation system, SBAS).

The display 1394 is configured to display an image, a video, and the like. The display 1394 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oLed, a quantum dot light-emitting diode (quantum dot light emitting diodes, QLED), and the like. In some embodiments, the electronic device 1300 may include one or N displays 1394, where N is a positive integer greater than 1.

The electronic device 1300 may implement a photographing function by using an ISP, the camera 1393, the video coder/decoder, a GPU, the display 1394, an application processor, and the like.

The camera 1393 is configured to capture a static image or a video.

The external memory interface 1320 may be used to connect an external memory card, for example, a Micro SD card, to extend a storage capability of the electronic device 1300. The external memory card communicates with the processor 1310 via the external memory interface 1320, to implement a data storage function. For example, a music file or a video file is stored in the external storage card.

The internal memory 1321 may be configured to store computer-executable program code, and the executable program code includes instructions. The internal memory 1321 may include a program storage area and a data storage area. The program storage area may store an operating system, an application required by at least one function (for example, a sound playing function or an image playing function), and the like. The data storage area may store data (such as audio data and a phone book) created during use of the electronic device 1300. In addition, the internal memory 1321 may include a volatile memory (volatile memory), for example, a random-access memory (random-access memory, RAM), and may further include a non-volatile memory (non-volatile memory), for example, at least one magnetic disk storage component, a universal flash storage (universal flash storage, UFS), a read-only memory (read-only memory, ROM), a flash memory, a hard disk drive (hard disk drive, HDD), or a solid state drive (solid state drive, SSD). A memory 1602 may further include a combination of the foregoing types of memories. The processor 1310 runs instructions stored in the internal memory 1321 and/or instructions stored in a memory disposed in the processor, to perform various function applications of the electronic device and data processing that are of the electronic device 1300.

The electronic device 1300 may implement an audio function by using the audio module 1370, the loudspeaker 1370A, the receiver 1370B, the microphone 1370C, the headset port 1370D, and an application processor. For example, music play and recording.

The audio module 1370 is configured to convert digital audio information into an analog audio signal for output, and is also configured to convert analog audio input into a digital audio signal. The audio module 1370 may further be configured to code and decode an audio signal. In some embodiments, the audio module 1370 may be disposed in the processor 1310, or some function modules in the audio module 1370 are disposed in the processor 1310.

A software system of the electronic device 100 may use a hierarchical architecture, an event-driven architecture, a microkernel architecture, a micro service architecture, or a cloud architecture. In this embodiment of the present invention, a software structure of the electronic device 1300 is described by using an Android system with a hierarchical architecture as an example.

When the processor 1310 is coupled to the internal memory 1321, the processor 1310 reads and executes instructions in the internal memory 1321. When the processor 1310 runs, the instructions are executed, so that the processor 1310 is further configured to perform the methods shown in FIG. 2 to FIG. 12.

A person of ordinary skill in the art may be aware that, in combination with the examples described in embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

A person of ordinary skill in the art may understand that all or some of the steps in each of the foregoing method of the embodiments may be implemented by a program instructing a processor. The foregoing program may be stored in a computer-readable storage medium. The storage medium may be a non-transitory (English: non-transitory) medium, like a random-access memory, read-only memory, a flash memory, a hard disk, a solid state drive, a magnetic tape (English: magnetic tape), a floppy disk (English: floppy disk), an optical disc (English: optical disc), or any combination thereof.

The foregoing descriptions are merely exemplary specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to a terminal device, wherein the terminal device comprises a system framework layer, a first application, a second application, and a third application, wherein the second application and the third application are each from a plurality of applications, and the second application and the third application are each a continuing application, and the method comprises:
   sending, by the system framework layer after the terminal device is connected to an in-vehicle device, a message to the first application notifying the first application that the terminal device is connected to the in-vehicle device;
   sending, by the first application, a first broadcast to the plurality of applications, wherein any applications of the plurality of applications that are not continuing applications ignore the first broadcast;
   sending, by the second application, first data information of the second application to the first application after receiving the first broadcast;
   sending, by the third application, first data information of the third application to the first application after receiving the first broadcast;
   generating, by the first application, a to-be-displayed interface based on the first data information of the second application and the first data information of the third application, wherein the to-be-displayed interface comprises a card corresponding to the second application and a card corresponding to the third application, wherein the card of the second application is generated based on the first data information of the second application, and wherein the card of the third application is generated based on the first data information of the third application; and
   sending, by the terminal device, the to-be-displayed interface to the in-vehicle device for displaying,
   wherein each continuing application is an application that is started and running prior to receiving the first broadcast.

2. The method according to claim 1, wherein the method further comprises:
   notifying, by the first application, based on the card of the second application being added to the to-be-displayed interface, the second application that the card of the second application is successfully added; and
   notifying, by the first application, based on the card of the third application being added to the to-be-displayed interface, the third application that the card of the third application is successfully added.

3. The method according to claim 1, wherein the method further comprises:
   sending, by the second application, second data information of the second application to the first application; and
   updating, by the first application, the card of the second application according to the second data information of the second application.

4. The method according to claim 1, wherein the method further comprises:
   receiving, by the first application, a removal message sent by the second application; and
   removing, according to the removal message, the card that is of the second application and that is displayed on the in-vehicle device.

5. The method according to claim 4, wherein the removal message comprises a card identity of the card of the second application.

6. The method according to claim 1, wherein the method further comprises:
   sending, by the first application, based on the terminal device being disconnected from the in-vehicle device, a removal notification to the second application and the third application separately to notify that the card of the second application and the card of the third application are removed.

7. The method according to claim 1, wherein the method further comprises:
   sending, by the first application based on the terminal device being disconnected from the in-vehicle device, a second broadcast to notify the second application and the third application that a connection between the terminal device and the in-vehicle device is disconnected.

8. The method according to claim 1, wherein the first data information of the second application comprises one or more of a card identity of the card of the second application, content of the second application, a package name of the second application, a card type of the card of the second application, or a priority of the card of the second application.

9. The method according to claim 1, wherein the second application is a navigation application or a music playing application.

10. A terminal device comprising:
    at least one processor;
    a non-transitory computer-readable storage medium storing a program to be executed by the at least one processor, the program including instructions to:
    send, by a system framework layer after the terminal device is connected to an in-vehicle device, a message to a first application notifying the first application that the terminal device is connected to the in-vehicle device;
    send, by the first application, a first broadcast to a plurality of applications, wherein the plurality of applications comprises a second application and a third application, the second application and the third application are each a continuing application, and any applications of the plurality of applications that are not continuing applications ignore the first broadcast;
    send, by the second application, first data information of the second application to the first application after receiving the first broadcast;
    send, by the third application, first data information of the third application to the first application after receiving the first broadcast;

generate, by the first application, a to-be-displayed interface based on the first data information of the second application and the first data information of the third application, wherein the to-be-displayed interface comprises a card corresponding to the second application and a card corresponding to the third application, wherein the card of the second application is generated based on the first data information of the second application, and wherein the card of the third application is generated based on the first data information of the third application; and send, by the terminal device, the to-be-displayed interface to the in-vehicle device for displaying, wherein each continuing application is an application that is started and running prior to receiving the first broadcast.

11. The terminal device according to claim 10, wherein the instructions further include instructions to:

notify, by the first application, based on the card of the second application being added to the to-be-displayed interface, the second application that the card of the second application is successfully added; and notify, by the first application, based on the card of the third application being added to the to-be-displayed interface, the third application that the card of the third application is successfully added.

12. The terminal device according to claim 10, wherein the instructions further include instructions to:

send, by the second application, second data information of the second application to the first application; and update, by the first application, the card of the second application according to the second data information of the second application.

13. The terminal device according to claim 10, wherein the instructions further include instructions to:

receive, by the first application, a removal message sent by the second application; and remove, according to the removal message, the card that is of the second application and that is displayed on the in-vehicle device.

14. The terminal device according to claim 13, wherein the removal message comprises a card identity of the card of the second application.

15. The terminal device according to claim 10, wherein the instructions further include instructions to:

send, by the first application, based on the terminal device being disconnected from the in-vehicle device, a removal notification to the second application and the third application separately to notify that the card of the second application and the card of the third application are removed.

16. The terminal device according to claim 10, wherein the instructions further include instructions to:

send, by the first application, based on the terminal device being disconnected from the in-vehicle device, a second broadcast to notify the second application and the third application that a connection between the terminal device and the in-vehicle device is disconnected.

17. The terminal device according to claim 10, wherein the first data information of the second application comprises one or more of a card identity of the card of the second application, content of the second application, a package name of the second application, a card type of the card of the second application, or a priority of the card of the second application.

18. The terminal device according to claim 10, wherein the second application is a navigation application or a music playing application.

19. A non-transitory computer-readable storage medium storing a program to be executed by at least one processor of a terminal device, the program including instructions that, when executed by the at least one processor of the terminal device, cause the terminal device to:

send, by a system framework layer after the terminal device is connected to an in-vehicle device, a message to a first application notifying the first application that the terminal device is connected to the in-vehicle device;

send, by the first application, a first broadcast to a plurality of applications, wherein the plurality of applications comprises a second application and a third application, the second application and the third application are each a continuing application, and any applications of the plurality of applications that are not continuing applications ignore the first broadcast;

send, by the second application, first data information of the second application to the first application after receiving the first broadcast;

send, by the third application, first data information of the third application to the first application after receiving the first broadcast;

generate, by the first application, a to-be-displayed interface based on the first data information of the second application and the first data information of the third application, wherein the to-be-displayed interface comprises a card corresponding to the second application and a card corresponding to the third application, wherein the card of the second application is generated based on the first data information of the second application, and wherein the card of the third application is generated based on the first data information of the third application; and send, by the terminal device, the to-be-displayed interface to the in-vehicle device for displaying, wherein each continuing application is an application that is started and running prior to receiving the first broadcast.

20. The non-transitory computer-readable storage medium according to claim 19, wherein the instructions are to further cause the terminal device to:

select, using either a whitelist or a blacklist, one or more applications from the plurality of applications to be an application that is not continued.

* * * * *